(12) United States Patent
Matsumoto et al.

(10) Patent No.: US 11,135,517 B2
(45) Date of Patent: Oct. 5, 2021

(54) COMPUTER-READABLE NON-TRANSITORY STORAGE MEDIUM HAVING IMAGE PROCESSING PROGRAM STORED THEREIN FOR DISPLAYING GAME WITH CURVED-SURFACE GAME FIELD, IMAGE PROCESSING SYSTEM, IMAGE PROCESSING APPARATUS, AND IMAGE PROCESSING METHOD

(71) Applicant: Nintendo Co., Ltd., Kyoto (JP)

(72) Inventors: Atsushi Matsumoto, Kyoto (JP); Tetsuya Satoh, Kyoto (JP)

(73) Assignee: NINTENDO CO., LTD., Kyoto (JP)

( * ) Notice: Subject to any disclaimer, the term of this patent is extended or adjusted under 35 U.S.C. 154(b) by 12 days.

(21) Appl. No.: 16/778,196

(22) Filed: Jan. 31, 2020

(65) Prior Publication Data
US 2020/0330875 A1    Oct. 22, 2020

(30) Foreign Application Priority Data

Apr. 22, 2019 (JP) .............................. JP2019-081013

(51) Int. Cl.
*A63F 13/655* (2014.01)
*A63F 13/537* (2014.01)
*A63F 13/213* (2014.01)

(52) U.S. Cl.
CPC .......... *A63F 13/655* (2014.09); *A63F 13/213* (2014.09); *A63F 13/537* (2014.09)

(58) Field of Classification Search
CPC ..... A63F 13/213; A63F 13/537; A63F 13/655
See application file for complete search history.

(56) References Cited

U.S. PATENT DOCUMENTS

| 2002/0060685 A1* | 5/2002 | Handley ................ G06T 17/05 345/582 |
| 2004/0102244 A1* | 5/2004 | Kryuchkov ......... G07F 17/3211 463/32 |
| 2005/0075167 A1* | 4/2005 | Beaulieu ............ G07F 17/3211 463/32 |
| 2006/0258444 A1* | 11/2006 | Nogami ................. A63F 13/10 463/30 |

(Continued)

FOREIGN PATENT DOCUMENTS

JP    2006-314633    11/2006

OTHER PUBLICATIONS

TomGamer, "This Little Piggy", 2014, Youtube.com, pp. 1-4, at https://www.youtube.com/watch?v=MTcDNSGKi3E (last visited Apr. 7, 2021). (Year: 2014).*

*Primary Examiner* — Steve Rowland
(74) *Attorney, Agent, or Firm* — Nixon & Vanderhye PC

(57) ABSTRACT

A plurality of terrain/background objects each including at least a part of a cylindrical curved surface are arranged within a virtual space, and an operation object to be operated on the basis of an operation input on an operation device is controlled within the virtual space. Furthermore, the plurality of terrain/background objects are rotated about rotation center axes on the basis of a movement instruction input to the operation device such that a relative positional relationship between each of the plurality of terrain/background objects and the operation object is changed. Then, an image of the virtual space to be displayed on a display device is generated using a virtual camera.

20 Claims, 17 Drawing Sheets

(56) References Cited

U.S. PATENT DOCUMENTS

| | | | |
|---|---|---|---|
| 2006/0287058 A1* | 12/2006 | Resnick | G07F 17/3211 463/19 |
| 2013/0310134 A1* | 11/2013 | Daeges | A63F 13/80 463/20 |
| 2016/0005210 A1* | 1/2016 | Borodavka | G06T 15/06 345/419 |
| 2016/0005263 A1* | 1/2016 | Keilwert | G07F 17/3206 463/33 |
| 2018/0270464 A1* | 9/2018 | Harviainen | H04N 13/128 |
| 2020/0110263 A1* | 4/2020 | Shariff | G06T 19/006 |

* cited by examiner

Fig. 3
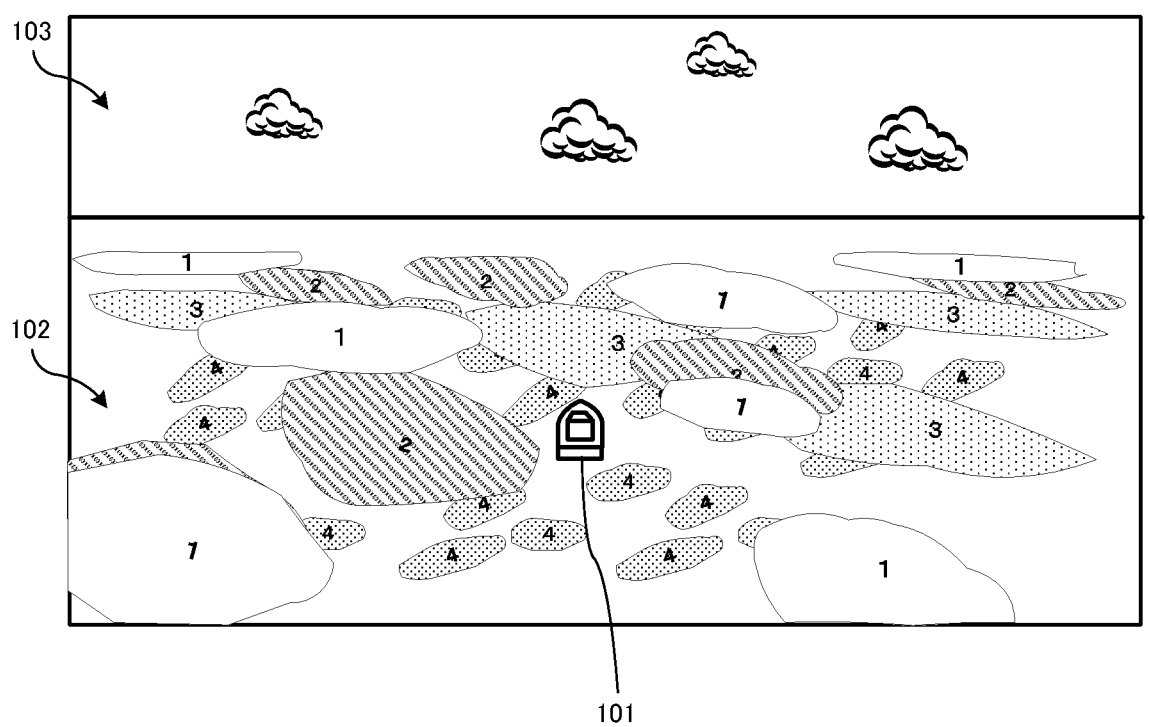
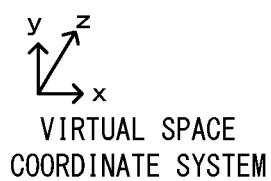
VIRTUAL SPACE
COORDINATE SYSTEM

Fig. 5
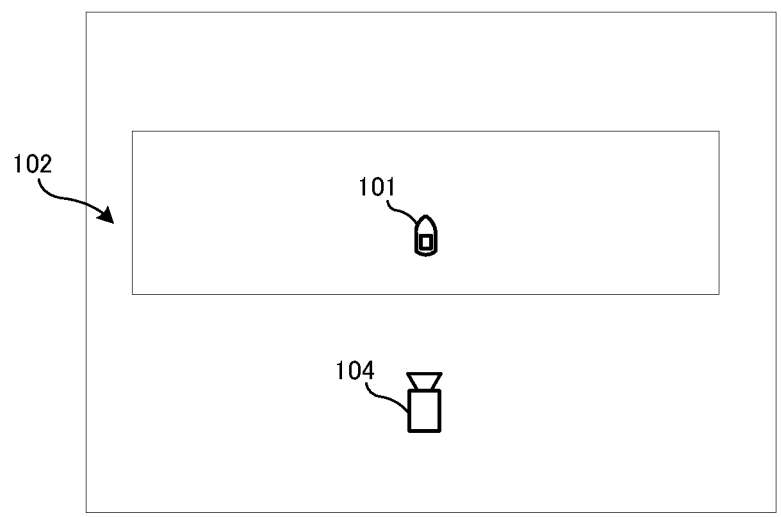
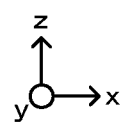
Fig. 6
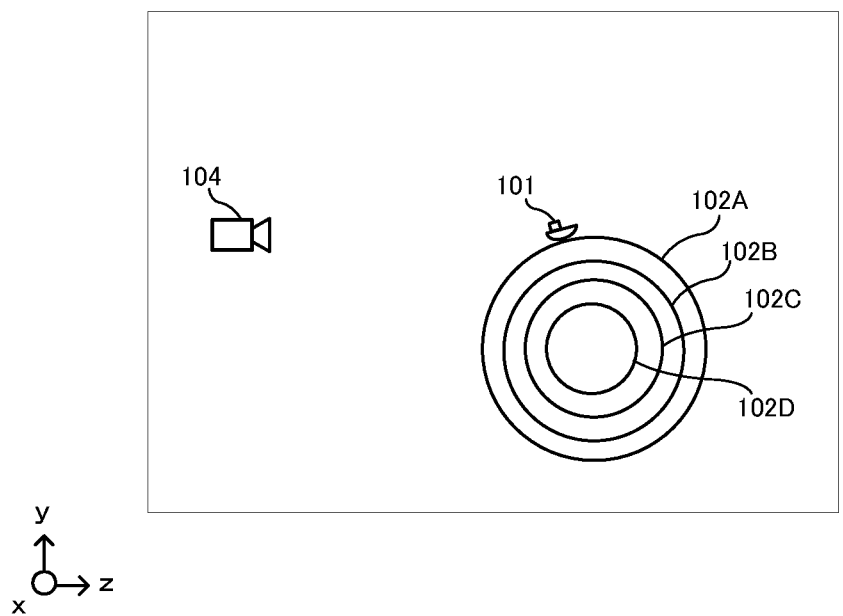
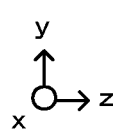

Fig. 22
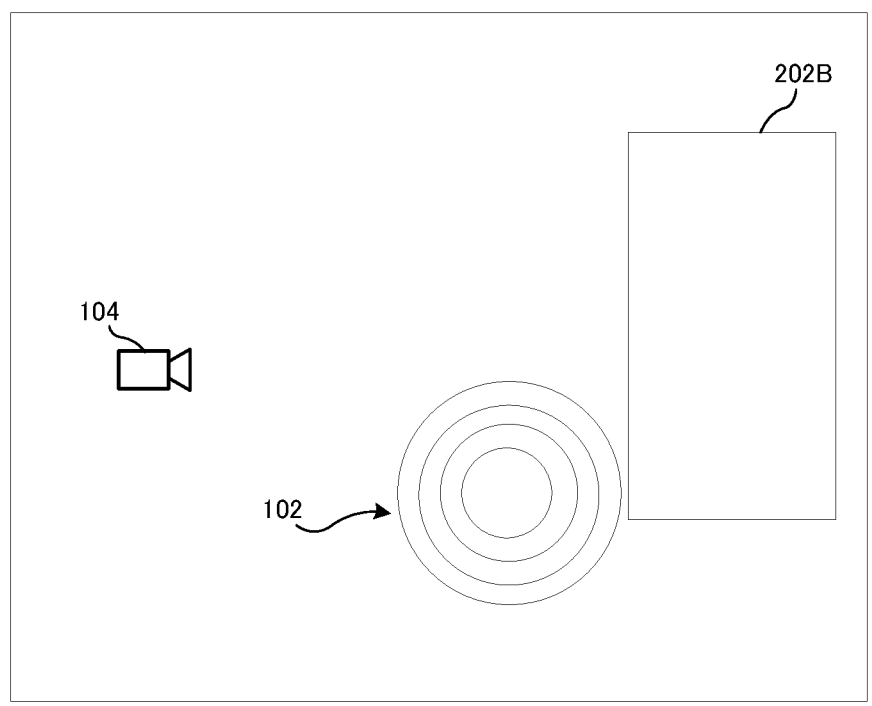
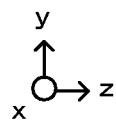

COMPUTER-READABLE NON-TRANSITORY STORAGE MEDIUM HAVING IMAGE PROCESSING PROGRAM STORED THEREIN FOR DISPLAYING GAME WITH CURVED-SURFACE GAME FIELD, IMAGE PROCESSING SYSTEM, IMAGE PROCESSING APPARATUS, AND IMAGE PROCESSING METHOD

CROSS REFERENCE TO RELATED APPLICATION

The disclosure of Japanese Patent Application No. 2019-081013, filed on Apr. 22, 2019, is incorporated herein by reference.

FIELD

The exemplary embodiments relate to image processing and more specifically relate to image processing for representing a terrain and a background.

BACKGROUND AND SUMMARY

Hitherto, a technology to represent a game screen in which objects are arranged on a cylindrical curved-surface game field has been known.

However, in the above technology, a simple game field such as the ground can be represented, but there is room for further improvement in terms of representation of a complicated terrain.

Therefore, it is an object of the exemplary embodiments to provide a computer-readable non-transitory storage medium having an image processing program stored therein, an image processing system, an image processing apparatus, and an image processing method that are capable of representing a more complicated terrain.

In order to attain the object described above, for example, the following configuration examples are exemplified.

A configuration example is directed to a computer-readable non-transitory storage medium having an image processing program stored therein, the image processing program causing a computer of an information processing apparatus to: arrange a plurality of terrain/background objects each including at least a part of a cylindrical curved surface or a spherical surface, within a virtual space; control an operation object to be operated on the basis of an operation input on an operation device, within the virtual space; rotate the plurality of terrain/background objects about rotation center axes, which are axes passing through centers of the cylinders or the spheres, on the basis of a movement instruction input to the operation device such that a relative positional relationship between each of the plurality of terrain/background objects and the operation object is changed; and generate an image of the virtual space to be displayed on a display device, using a virtual camera.

According to the above configuration example, the plurality of terrain/background objects are rotated on the basis of the movement instruction for the operation object such that the relative positional relationship with the operation object is changed. Accordingly, through simple processing of rotating the plurality of terrain/background objects, it is possible to represent a more complicated terrain and background involving movement of the terrain and the background based on the movement instruction operation for the operation object.

In another configuration example, the plurality of terrain/background objects may be each at least a part of a cylindrical curved surface or a spherical surface of a multi-layer structure, at least a part of the surface may allow a back side thereof to be seen therethrough, and the cylinders or the spheres may have radii different from each other. The image processing program may cause the computer to rotate the plurality of terrain/background objects about the common rotation center axis at rotation speeds different from each other, on the basis of the movement instruction input.

According to the above configuration example, the plurality of terrain/background objects are arranged within the virtual space so as to form a multi-layer structure, and the surface of each of the terrain/background objects has a portion that allows the back side thereof to be seen therethrough. In addition, the plurality of terrain/background objects are formed as a concentric multi-layer structure, and are rotated at speeds different from each other. Accordingly, the rotation speed of the terrain/background object close to the operation object and the rotation speed of the terrain/background object distant from the operation object can be different from each other, so that it is possible to represent a complicated terrain with a sense of depth such as a sea surface.

In another configuration example, the plurality of terrain/background objects may be each at least a part of a cylindrical curved surface or a spherical surface of a multi-layer structure, at least a part of the surface may allow a back side thereof to be seen therethrough, and the cylinders or the spheres may have radii different from each other. The image processing program may cause the computer to rotate the plurality of terrain/background objects about the rotation center axes different from each other at rotation speeds different from each other, on the basis of the movement instruction input.

According to the above configuration example, the plurality of terrain/background objects each having a portion that allows the back side thereof to be seen therethrough are arranged within the virtual space so as to form a non-concentric multi-layer structure, and are rotated at rotation speeds different from each other. Accordingly, it is possible to represent a complicated terrain with a sense of depth.

In another configuration example, the rotation center axes different from each other may be set such that the rotation center axis of the terrain/background object having the cylindrical curved surface or the spherical surface more distant from a position of the operation object is located closer to the operation object.

According to the above configuration example, the terrain/background object closer to the operation object can be shown to move at a faster speed. Accordingly, it is possible to represent a terrain with a sense of depth through simple processing.

In another configuration example, the image processing program may cause the computer to: dispose the operation object on the cylindrical curved surface or the spherical surface; and control the virtual camera within the virtual space such that the operation object is included in a field of view of the virtual camera.

According to the above configuration example, a more complicated terrain can be represented, and a state where the operation object is moving within the virtual space can also be represented.

In another configuration example, the plurality of terrain/background objects may be arranged in an orientation in which the rotation center axes thereof are parallel to each other, and in a positional relationship in which the terrain/ background objects are adjacent to each other without overlapping each other within the virtual space. The image processing program may cause the computer to rotate the terrain/background objects on the basis of the movement instruction input such that rotation directions of the terrain/background objects adjacent to each other are opposite to each other.

According to the above configuration example, the terrain/background objects arranged adjacent to each other are rotated in directions opposite to each other on the basis of the movement instruction input. Accordingly, it is possible to represent a complicated background with a sense of depth through simple processing of rotating the terrain/background objects.

In another configuration example, the image processing program may cause the computer to dispose a first terrain/background object at a position included at one side of a boundary and dispose a second terrain/background object at a position included at another side of the boundary, when a predetermined straight line passing through substantially a center of the image of the virtual space to be displayed on the display device is defined as the boundary. The image processing program may also cause the computer to rotate the first terrain/background object and the second terrain/background object such that rotation directions thereof are opposite to each other.

According to the exemplary embodiments, it is possible to perform representation involving movement of a more complicated terrain and background.

BRIEF DESCRIPTION OF THE DRAWINGS

FIG. 3 shows a non-limiting example of a game screen in a first exemplary embodiment;

FIG. 5 is a diagram showing the arrangement relationship between the virtual camera and the terrain/background objects in the first exemplary embodiment;

FIG. 6 is a diagram showing the arrangement relationship between the virtual camera and the terrain/background objects in the first exemplary embodiment;

FIG. 22 is a diagram showing the arrangement relationship between the virtual camera and the terrain/background objects in the third exemplary embodiment;

DETAILED DESCRIPTION OF NON-LIMITING EXAMPLE EMBODIMENTS

First Exemplary Embodiment

Hereinafter, a first exemplary embodiment will be described.

Figure 1:
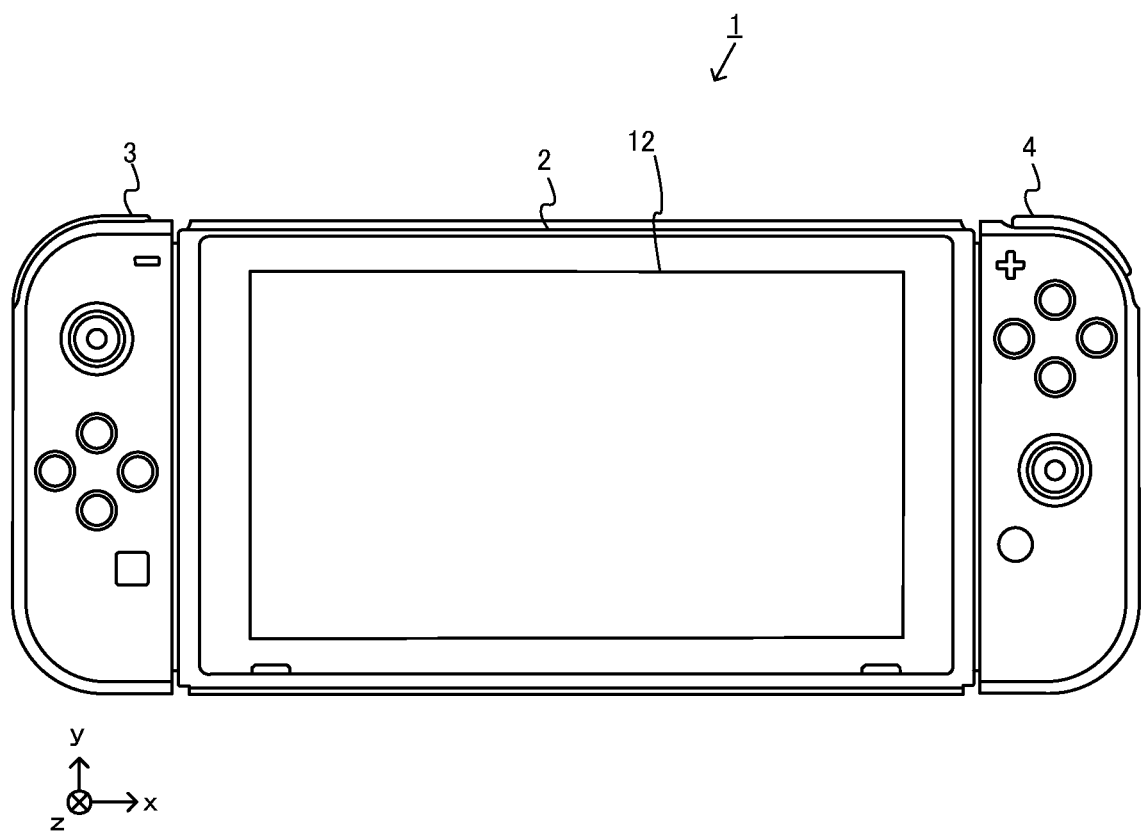
FIG. 1 is a diagram showing a non-limiting example of a state where a left controller 3 and a right controller 4 are attached to a main body apparatus 2.

First, an information processing system for performing information processing according to the exemplary embodiment will be described. In the exemplary embodiment, a game system will be described as an example of the information processing system. This game system may be any system. As an example, FIG. 1 shows the external view of a game system used in this example. The game system 1 shown in FIG. 1 includes a main body apparatus (an information processing apparatus; which functions as a game apparatus main body in the exemplary embodiment) 2, a left controller 3, and a right controller 4. Each of the left controller 3 and the right controller 4 is attachable to and detachable from the main body apparatus 2. That is, the game system 1 can be used as a unified apparatus obtained by attaching each of the left controller 3 and the right controller 4 to the main body apparatus 2. Furthermore, in the game system 1, the main body apparatus 2, the left controller 3, and the right controller 4 can also be used as separate bodies. FIG. 1 is a diagram showing an example of the state where the left controller 3 and the right controller 4 are attached to the main body apparatus 2. As shown in FIG. 1, each of the left controller 3 and the right controller 4 is attached to and unified with the main body apparatus 2. The main body apparatus 2 is an apparatus for performing various types of processing (e.g., game processing) in the game system 1. The main body apparatus 2 includes a display 12. Each of the left controller 3 and the right controller 4 is an apparatus including operation sections with which a player provides inputs.

Figure 2:
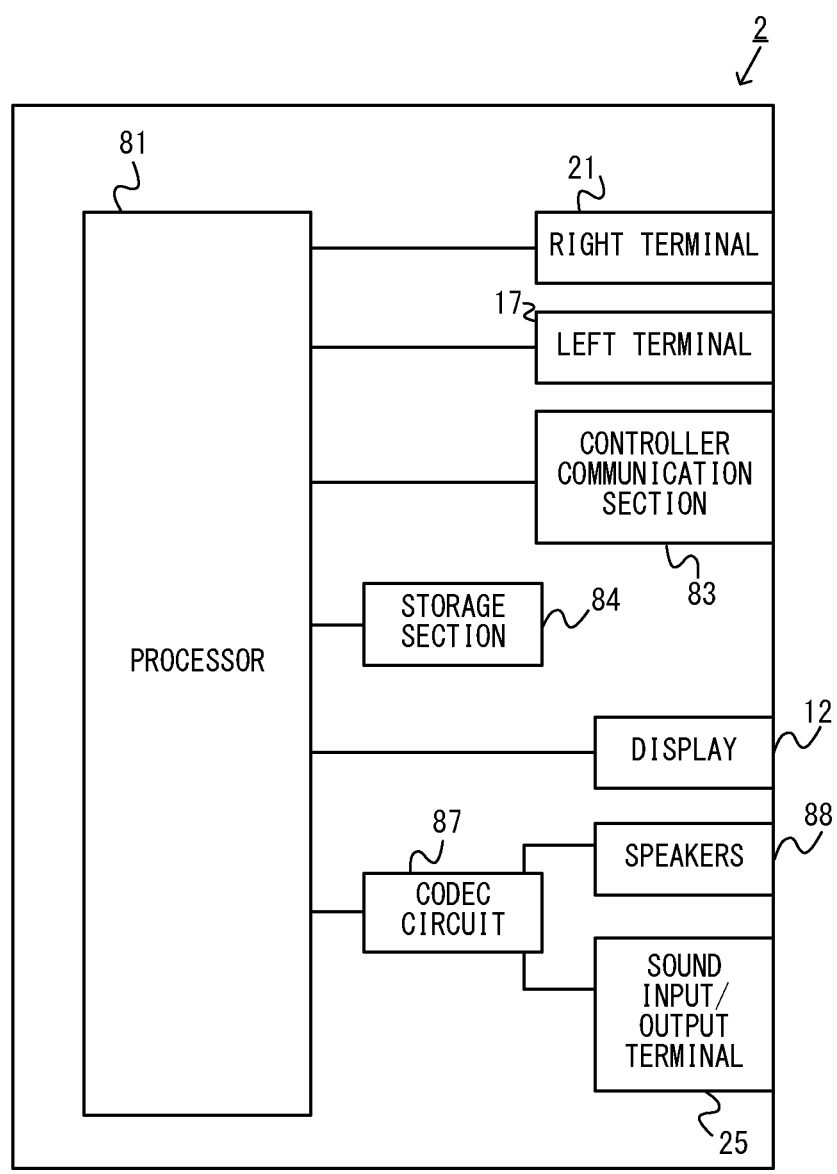
FIG. 2 is a block diagram showing a non-limiting example of the internal configuration of the main body apparatus 2.

FIG. 2 is a block diagram showing an example of the internal configuration of the main body apparatus 2. The main body apparatus 2 includes a processor 81. The processor 81 is an information processing section for executing various types of information processing to be executed by the main body apparatus 2. For example, the processor 81 may be composed only of a CPU (Central Processing Unit), or may be composed of a SoC (System-on-a-chip) having a plurality of functions such as a CPU function and a GPU (Graphics Processing Unit) function. The processor 81 performs the various types of information processing by executing an information processing program (e.g., a game program) stored in a storage section 84. The storage section 84 may be, for example, an internal storage medium such as a flash memory and a dynamic random access memory (DRAM), or may be configured to utilize an external storage medium mounted to a slot that is not shown, or the like.

The main body apparatus 2 includes a controller communication section 83. The controller communication section 83 is connected to the processor 81. In the case of using the main body apparatus 2 and the left controller 3 and the right controller 4 as separate bodies, the controller communication section 83 wirelessly communicates with the left controller 3 and/or the right controller 4. The method for communication between the main body apparatus 2 and the left controller 3 and the right controller 4 is optional. In the exemplary embodiment, the controller communication section 83 performs communication compliant with the Bluetooth (registered trademark) standard with the left controller 3 and with the right controller 4.

Furthermore, the main body apparatus 2 includes: a left terminal 17 that is a terminal for the main body apparatus 2 to perform wired communication with the left controller 3; and a right terminal 21 that is a terminal for the main body apparatus 2 to perform wired communication with the right controller 4.

Furthermore, the display 12 is connected to the processor 81. The processor 81 displays a generated image (e.g., an image generated by executing the above information processing) and/or an externally acquired image on the display 12.

The main body apparatus 2 includes a codec circuit 87 and the speakers (specifically, a left speaker and a right speaker) 88. The codec circuit 87 is connected to the speakers 88 and a sound input/output terminal 25 and also connected to the processor 81. The codec circuit 87 is a circuit for controlling the input and output of sound data to and from the speakers 88 and the sound input/output terminal 25.

Although not shown, it is also possible to output an image and sound generated by the main body apparatus 2, to an external monitor/external speaker via a predetermined output terminal.

[Controllers]

Although not shown, the left controller 3 and the right controller 4 each include a communication control section that communicates with the main body apparatus 2. In a state where the left controller 3 and the right controller 4 are attached to the main body apparatus 2, wired communication can be performed via the left terminal 17 and the right terminal 21. Moreover, in the case of using the main body apparatus 2 and the left controller 3 and the right controller 4 as separate bodies, communication with the main body apparatus 2 can be performed through wireless communication without being performed via the terminals. The communication control section acquires information regarding an input (specifically, information regarding an operation) from each input section of the controller. Then, the communication control section transmits operation data including the acquired information (or information obtained by performing predetermined processing on the acquired information) to the main body apparatus 2. It should be noted that the operation data is transmitted repeatedly, once every predetermined time. It should be noted that the interval at which the information regarding an input is transmitted from each of the input sections to the main body apparatus 2 may or may not be the same.

[Outline of Image Control Processing in First Exemplary Embodiment]

Next, an outline of operation of image processing performed by the game system according to the first exemplary embodiment will be described. In the processing according to the exemplary embodiment, a plurality of terrain/background objects are arranged as objects having a cylindrical shape, and a more complicated terrain or the like is represented. Specifically, in the first exemplary embodiment, a player object that is an object to be operated with the above controllers is present on a sea surface (which is a kind of terrain), and image processing for representing a state where the player object is moving on the sea surface will be described as an example.

FIG. 3 shows an example of a game screen in the first exemplary embodiment. In FIG. 3, a sea surface object 102 that is an example of the terrain/background object is displayed. FIG. 3 shows a state where a player object 101 having a shape representing a ship is present on the sea surface object 102. Here, the sea surface object 102 in the exemplary embodiment is a terrain/background object having a cylindrical shape and having a cylindrical curved surface, a part of which is displayed as a game image. The sea surface object 102 is disposed within a game space such that a cylinder axis thereof (an axis orthogonal to the top surface and the bottom surface of the cylinder and passing through the center of the cylinder) horizontally extends. In addition, in this example, four sea surface objects 102 are prepared as an example, and are arranged so as to form a cylinder having a multi-layer structure with different radii as described later. In FIG. 3, for convenience of explanation, non-transmissive portions (described later) that are portions of the sea surface object 102 of each layer are each shown with any of numbers from 1 to 4 assigned thereto. For convenience of explanation, each number indicates which of the four sea surface objects (sea surface objects 102A to 102D in FIG. 4) the corresponding non-transmissive portion belongs to, and this number is not displayed in an actual game image.

Figure 4:
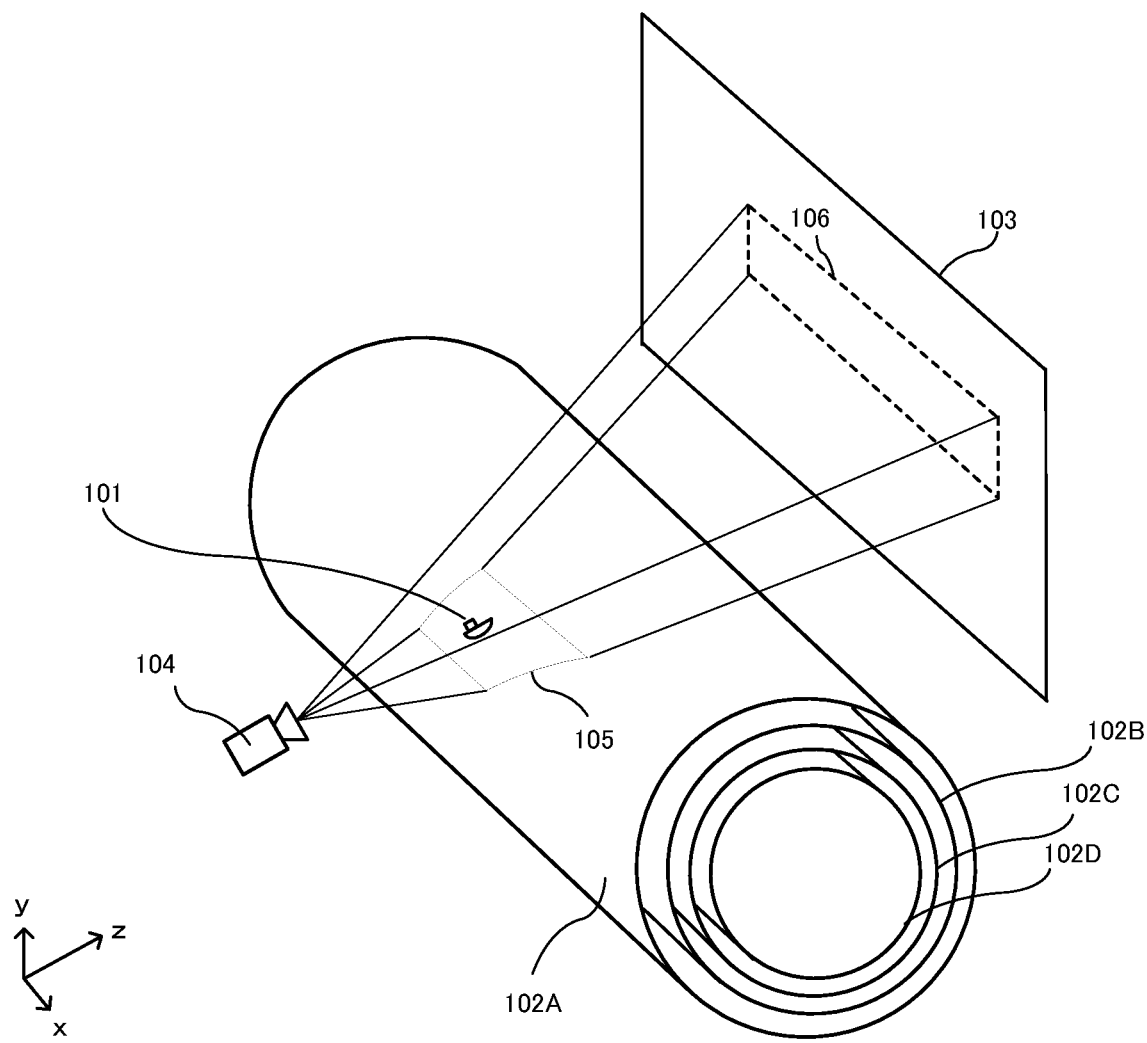
FIG. 4 is a diagram showing an arrangement relationship between a virtual camera and terrain/background objects in the first exemplary embodiment.

FIGS. 4 to 6 are schematic diagrams showing a state of a virtual three-dimensional game space (hereinafter, virtual game space) according to the first exemplary embodiment, and are also diagrams showing an arrangement relationship between a virtual camera 104 for obtaining the above game image and the sea surface objects 102. FIG. 4 is a schematic diagram showing a perspective view of the virtual game space. FIG. 5 is a schematic view of the virtual game space in FIG. 4 as seen along a y-axis (overhead view). FIG. 6 is a view of the virtual game space in FIG. 4 as seen along an x-axis.

In FIG. 4, the sea surface objects 102A to 102D (sometimes collectively referred to as sea surface objects 102 in the following description) and a background image 103 are set in the game space. The sea surface objects 102A to 102D having a cylindrical shape are arranged so as to form a concentric multi-layer structure. Moreover, the player object 101 is disposed on the sea surface object 102A. In a coordinate system of the virtual game space shown in FIG.

4 (hereinafter, a game space coordinate system), the virtual camera 104 is disposed laterally to the cylindrical curved surface of the sea surface object 102. Then, a game space that is set with a visual volume defined between predetermined clip planes based on the position of the virtual camera 104, is displayed as a game image on the display 12. In the example shown in FIG. 4, the game image is composed of an image 105 obtained by perspective projection of a part of the cylindrical curved surface of the sea surface object 102 from the virtual camera 104, and an image 106 obtained by perspective projection of the background image 103 rendered behind the image 105. The background image 103 is different from the above terrain/background objects and is an image of a single picture.

The case where a player has performed an instruction operation intended to change the positional relationship between the player object 101 and another object (specifically, the terrain/background object) in a state where such a game image is displayed, is assumed. In this example, an instruction operation for moving the player object 101 has been performed on the above controllers. In this case, the position of the player object 101 in the game space coordinate system is not changed, and the sea surface object 102 is rotated about the cylinder axis thereof, thereby representing a state where the player object 101 is moving on the sea surface. A conceivable example of such an operation is an input in the up direction with an analog stick or a direction instruction key as an instruction input for moving the player object 101 in the screen depth direction (z-axis positive direction). In addition, an operation of pressing down a predetermined button assigned as a function of an "accelerator" or the like is also conceivable. When such a movement instruction operation has been performed, control, in which the sea surface objects 102 are rotated about the cylinder axes thereof in the direction from the screen depth side toward the virtual camera 104 (the near-side direction in FIG. 3), is performed. The cylinder axis can also be considered as an axis that serves as a center of rotation (rotation center axis). Accordingly, a state where the player object 101 is moving in the screen depth direction can be represented. Moreover, when an instruction input for moving the player object 101 in the direction toward the virtual camera side (the screen near side) has been performed, control, in which the sea surface object 102 is rotated about the cylinder axis thereof in the screen depth direction from the virtual camera 104 side, is performed. Accordingly, a state where the player object 101 is moving in the screen near-side direction can be represented. As a result of such rotation, the position of the player object 101 on the circumferential surface of the sea surface object 102 is also changed. That is, the relative positional relationship between (the circumferential surface of) the sea surface object 102 and the player object 101 is changed.

Other objects may be arranged on the sea surface object 102. In this case, the other objects may be moved together with rotation of the sea surface object 102 about the cylinder axis thereof. That is, the positions of the other objects in the game space coordinate system may be changed while the relative positional relationships between the sea surface object 102 and the other objects are maintained.

Next, the four sea surface objects 102A to 102D arranged so as to form a multi-layer structure as described above will be further described. In this example, the four sea surface objects 102A to 102D having a cylindrical shape have radii different from each other. As shown in FIG. 6 described above, the four sea surface objects 102A to 102D are arranged so as to form a concentric multi-layer structure when seen from the top surface or the bottom surface of the cylinder.

Figure 7:
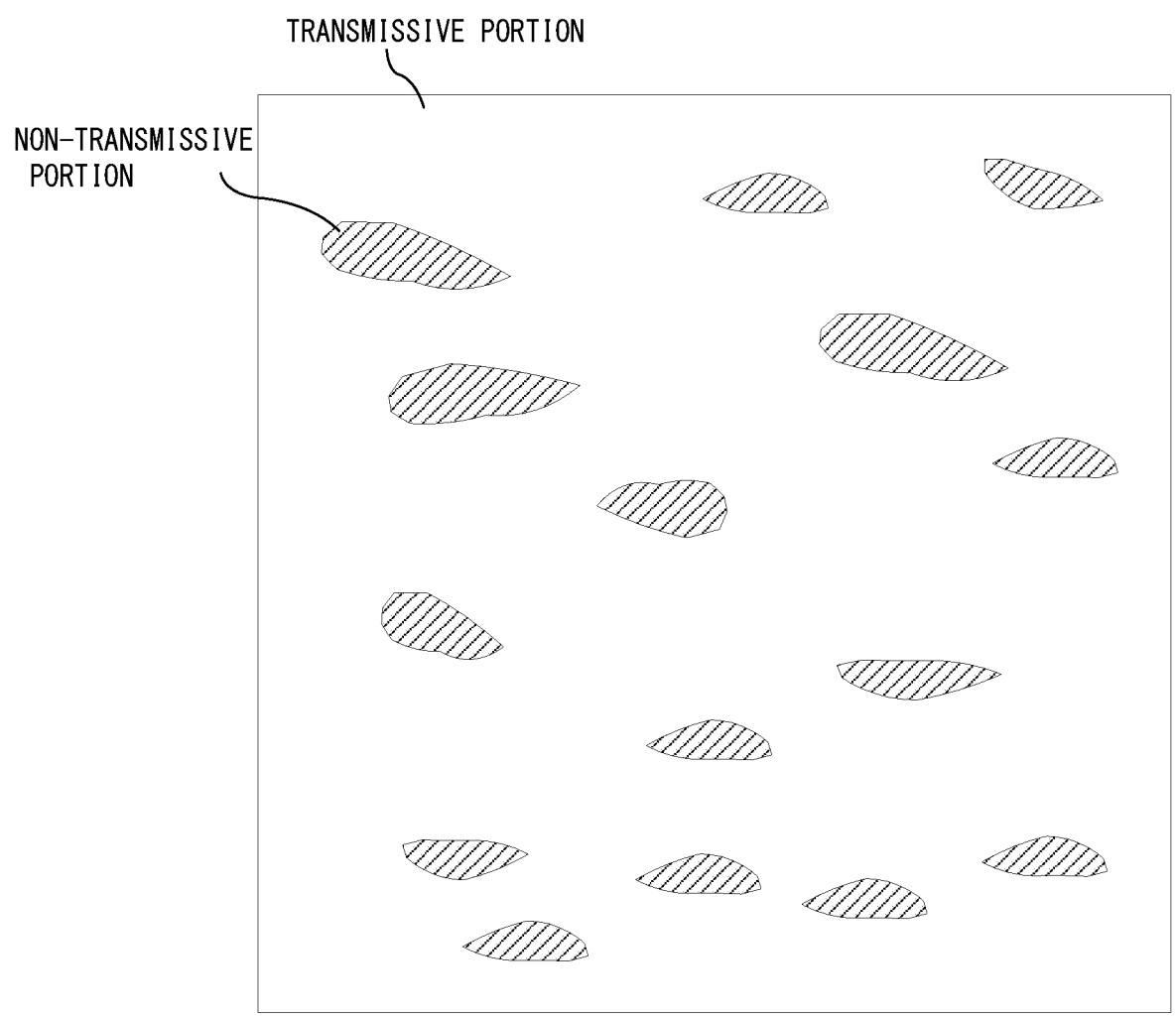
FIG. 7 is a development of a cylindrical curved surface.
Figure 8:
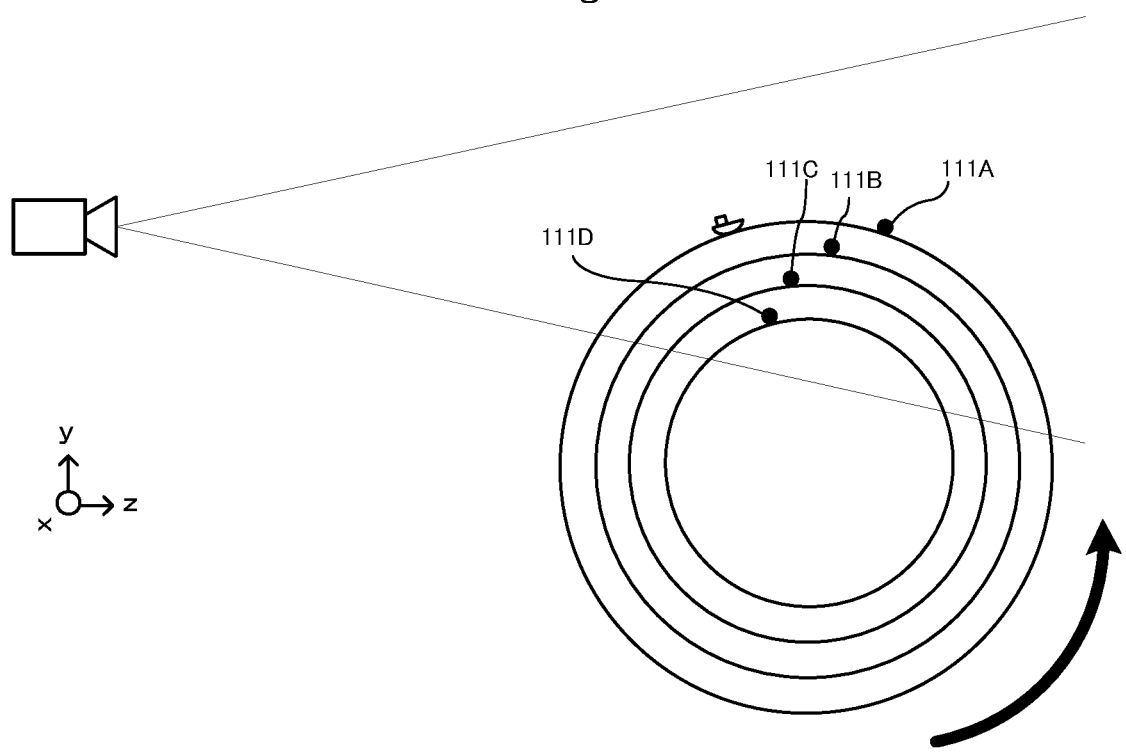
FIG. 8 is a diagram for explaining change of a relative positional relationship between sea surface objects 102 and a player object.
Figure 9:
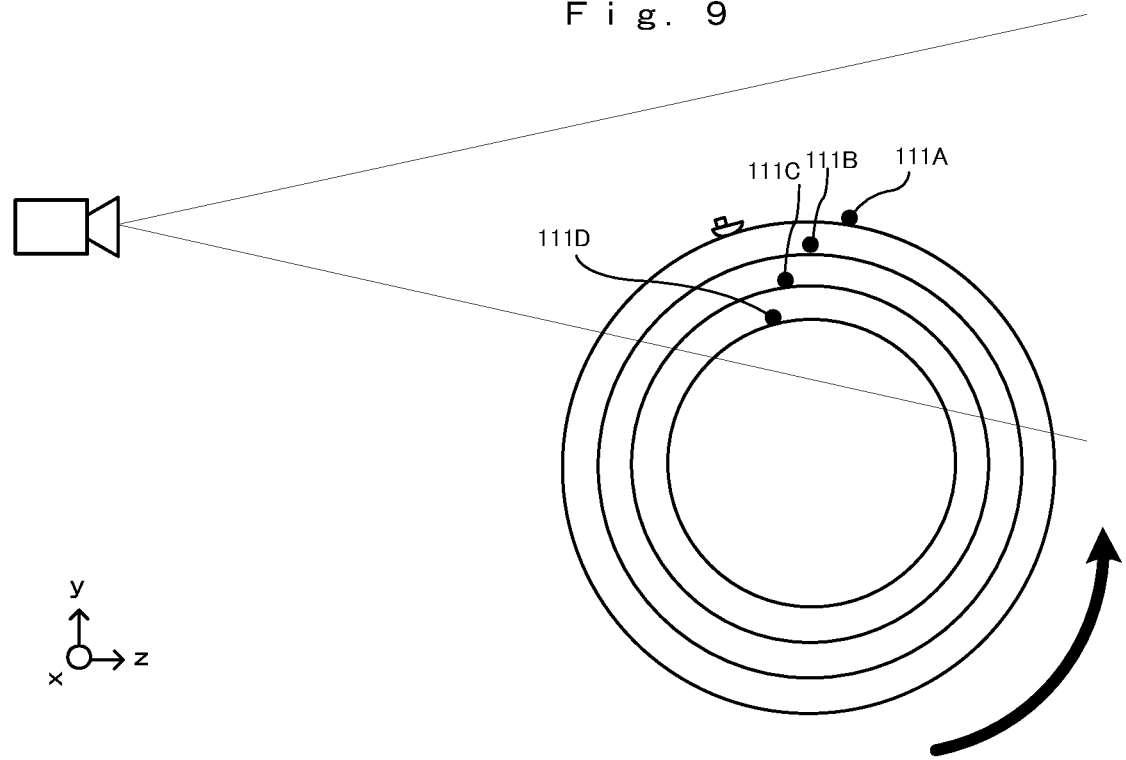
FIG. 9 is a diagram for explaining change of the relative positional relationship between the sea surface objects 102 and the player object.
Figure 10:
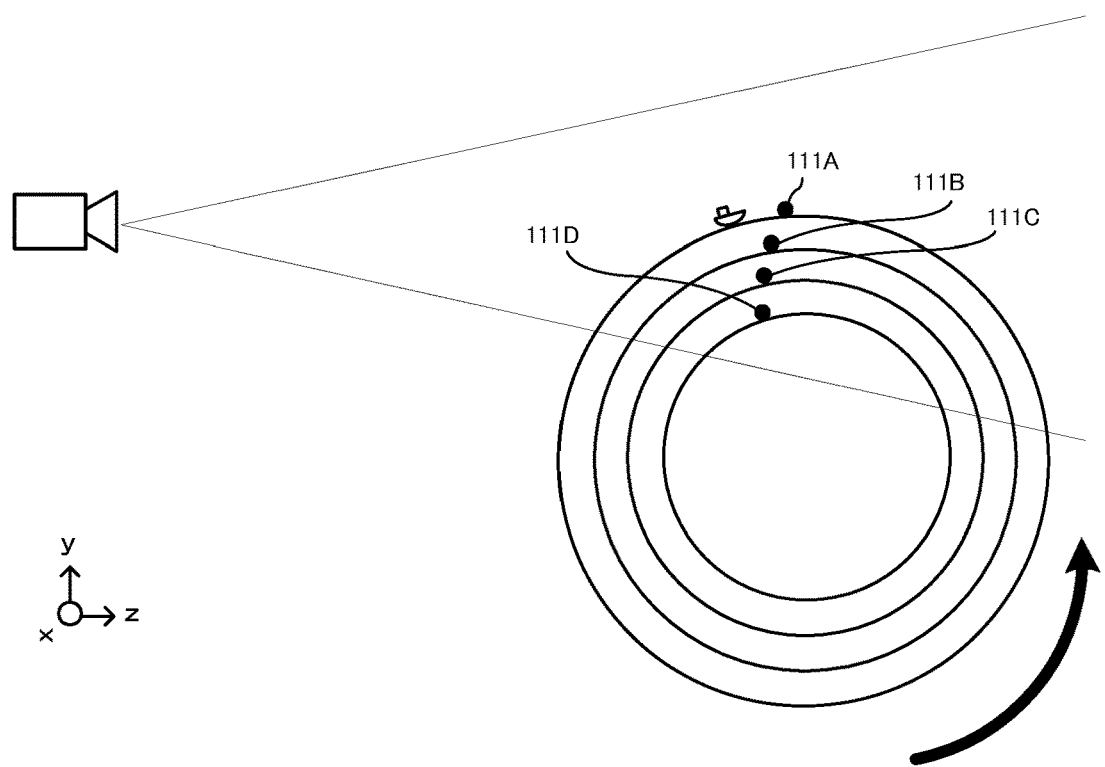
FIG. 10 is a diagram for explaining change of the relative positional relationship between the sea surface objects 102 and the player object.
Figure 11:
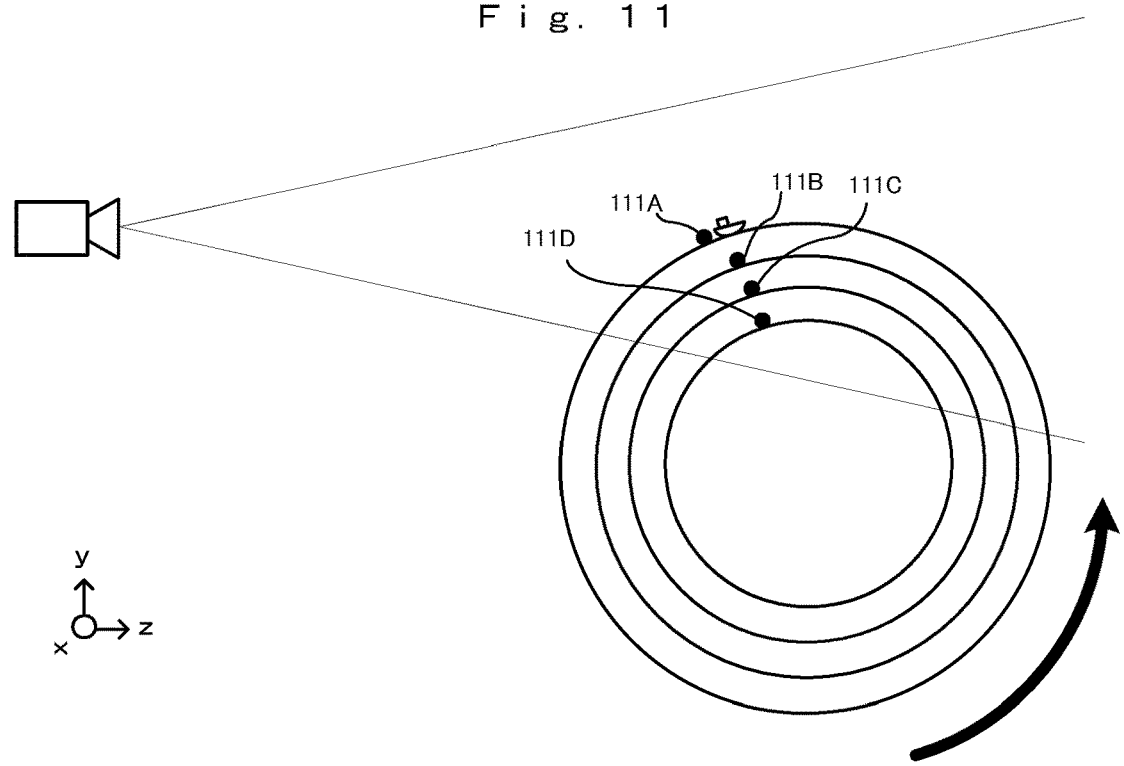
FIG. 11 is a diagram for explaining change of the relative positional relationship between the sea surface objects 102 and the player object.

A part that is the cylindrical curved surface of each sea surface object has a transmissive portion and non-transmissive portions. FIG. 7 shows a development of the cylindrical curved surface of a certain sea surface object 102. In FIG. 7, hatched portions are non-transmissive portions, and the other portion is a transmissive portion. The transmissive portion is a portion having a transmittance (transparency) of 100% (complete transmission), and the non-transmissive portions are each a portion having a transmittance of 0% (complete non-transmission). The sea surface objects 102 are arranged so as to form a multi-layer structure as described above. Thus, as a game image, for example, in the transmissive portion of the sea surface object 102A (the uppermost layer), images of the sea surface objects 102B to 102D located below the sea surface object 102A are seen. For example, in FIG. 3 described above, any of numbers from 1 to 4 is shown in each non-transmissive portion of each sea surface object 102. In FIG. 3, each of non-transmissive portions with a number of 1 is a non-transmissive portion of the sea surface object 102A, each of non-transmissive portions with a number of 2 is a non-transmissive portion of the sea surface object 102B, each of non-transmissive portions with a number of 3 is a non-transmissive portion of the sea surface object 102C, and each of non-transmissive portions with a number of 4 is a non-transmissive portion of the sea surface object 102D. Thus, as a game image, the non-transmissive portions of the sea surface object 102A having a positional relationship closest to the player object 101 among the sea surface objects 102A to 102D are displayed at the nearest side. Moreover, the game image is seen such that the non-transmissive portions of the sea surface object 102D having a positional relationship farthest from the player object 101 is displayed at the endmost depth side.

Furthermore, in the exemplary embodiment, when a movement instruction input for the player object 101 has been performed as described above, each sea surface object 102 is rotated about the cylinder axis thereof. At that time, the rotation speeds of the respective sea surface objects per unit time are made different from each other. For example, it is assumed that the rotation speeds are indicated in 10 levels, speed 1 is the slowest rotation speed, and speed 10 is the fastest rotation speed. In this case, as an example, the sea surface object 102A is rotated at speed 10, the sea surface object 102B is rotated at speed 7, the sea surface object 102C is rotated at speed 5, and the sea surface object 102D is rotated at speed 2. Accordingly, for example, when the player object 101 is moved in the screen depth direction, the non-transmissive portions of the sea surface object 102A can be shown to come close to the near side at a higher speed than the non-transmissive portions of the sea surface object 102D. As a result, it is possible to represent a sea surface with a sense of depth and perspective in the direction toward the seabed (direction from the cylindrical curved surface to the cylinder axis).

FIGS. 8 to 11 show the difference in rotation speed as described above and an example of change of the relative positional relationship between the sea surface objects 102 and the player object 101. FIGS. 8 to 11 are each a diagram in the case where the virtual game space is seen along the x-axis direction. In these figures, the position of a certain non-transmissive portion of the sea surface object 102A is shown as a circle 111A, the position of a certain non-transmissive portion of the sea surface object 102B is shown as a circle 111B, the position of a certain non-transmissive portion of the sea surface object 102C is shown as a circle 111C, and the position of a certain non-transmissive portion of the sea surface object 102D is shown as a circle 111D. Here, the case where each sea surface object 102 is rotated about the cylinder axis thereof counterclockwise is taken as an example. As for the rotation speeds, the rotation speeds of the sea surface objects are faster in the order of the sea surface objects closer to the player object 101. In this example, the rotation speeds of the sea surface objects become slower in the order of the sea surface objects 102A, 102B, 102C, and 102D. Therefore, when a change is made from the state of FIG. 8 in the order of FIG. 9, FIG. 10, and FIG. 11, the positional relationship between the player object 101 and the circle 111A is changed the most. That is, in the change from FIG. 8 to FIG. 11, the speed at which the position of the circle 111A changes is the fastest, and the speed at which the position of the circle 111D changes is the slowest.

As described above, in the first exemplary embodiment, objects having a cylindrical shape are arranged as terrain/background objects, transmissive portions and non-transmissive portions are provided on the cylindrical curved surfaces of the objects, and a terrain and a background are presented using the cylindrical curved surfaces (mainly the non-transmissive portions). Furthermore, such terrain/background objects having a cylindrical shape are arranged within a virtual space so as to form a concentric multi-layer structure. Then, when a movement instruction input for a player object has been performed, the player object itself is not moved, and the respective terrain/background objects are rotated about the cylinder axes thereof in a predetermined direction at speeds different from each other. Accordingly, it is possible to represent a complicated terrain with a sense of depth in the direction from the cylindrical curved surface toward the cylinder axis, through simple processing, having a low processing load, of merely rotating the terrain/background objects having a cylindrical shape.

[Details of Game Processing of Exemplary Embodiment]

Figure 12:
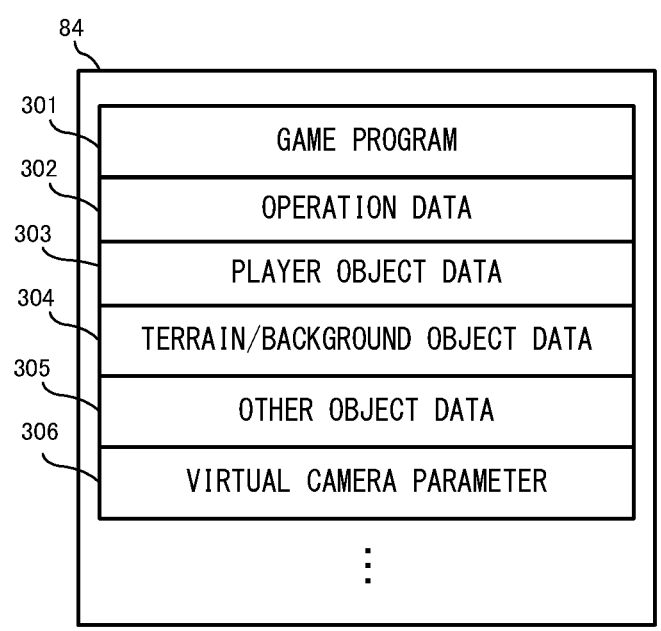
FIG. 12 is a memory map showing a non-limiting example of various kinds of data stored in a storage section 84.

Next, the game processing in the exemplary embodiment will be described in more detail with reference to FIGS. 12 and 13.

[Data to be Used]

First, various kinds of data to be used in the game processing will be described. FIG. 12 is a memory map showing an example of various kinds of data stored in the storage section 84 of the main body apparatus 2. In the storage section 84 of the main body apparatus 2, a game program 301, operation data 302, player object data 303, terrain/background object data 304, other object data 305, a virtual camera parameter 306, etc., are stored.

The game program 301 is a program for performing the game processing according to the exemplary embodiment.

The operation data 302 is data acquired from the left controller 3 and the right controller 4, and is data indicating the content of an operation by the player. The operation data 302 includes data indicating pressed states of various buttons of each controller, data for indicating the content of an operation on the analog stick, etc.

The player object data 303 is data regarding the player object 101 and includes data indicating the appearance of the player object 101, etc.

The terrain/background object data 304 is data indicating terrain/background objects having a cylindrical shape as described above. In the exemplary embodiment, the terrain/background object data 304 is data indicating the above four sea surface objects 102. The data includes information indicating the radius of each sea surface object 102, and information that defines the content of a circumferential curved surface. Examples of the information that defines the content of a circumferential curved surface include information that defines the positions of a transmissive portion and non-transmissive portions of the circumferential curved surface, and image data of the transmissive portion and the non-transmissive portions. In addition, the data also includes information regarding rotation speed upon rotation about a cylinder axis. For example, a predetermined coefficient may be defined as the information. In this case, a rotation speed of each sea surface object can be calculated by multiplying a movement instruction input by the player, a movement speed, or the like, which is set for the player object 101, by the coefficient. Moreover, a value directly indicating a rotation speed may be defined. The data regarding rotation speed is set such that the rotation speed of the sea surface object 102 closer to the cylinder center axis in the multi-layer structure is slower.

The other object data 305 is data that defines various objects other than the player object and the terrain/background objects, such as enemy objects.

The virtual camera parameter 306 is data that defines parameters such as the position, the direction, the angle of view, etc., of a virtual camera within a virtual game space.

[Details of Processing Performed by Processor 81]

Next, the game processing according to the first exemplary embodiment will be described in detail with reference to a flowchart in FIG. 13. The flowchart shown in FIG. 13 shows processes performed when a player object moves on sea, in the game processing. Here, processes on the terrain/background objects (sea surface objects 102) will be mainly described, and the detailed description of other game processing is omitted. In addition, a processing loop of steps S2 to S8 shown in FIG. 13 is repeatedly performed, for example, every frame period.

The flowchart is merely an example of the processing. Therefore, the order of each process step may be changed as long as the same result is obtained. In addition, the values of variables and thresholds used in determination steps are also merely examples, and other values may be used as necessary.

Figure 13:
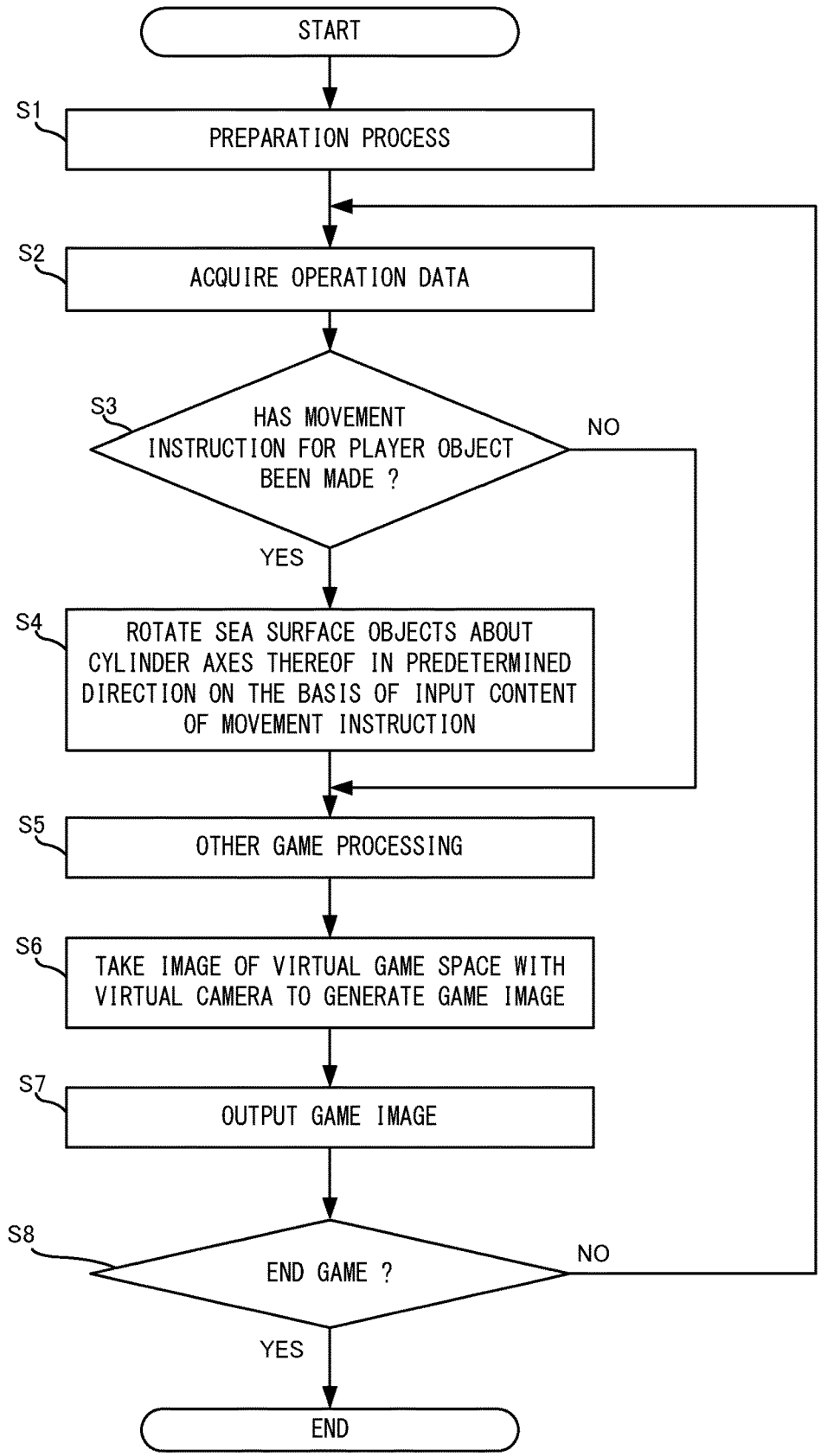
FIG. 13 is a flowchart showing the details of game processing according to the first exemplary embodiment.

In FIG. 13, first, in step S1, the processor 81 performs a preparation process. This process is a process for constructing a virtual game space as shown in FIGS. 3 to 6, etc. Specifically, the processor 81 generates four sea surface objects having a cylindrical shape as shown in FIGS. 4 to 6 described above, on the basis of the terrain/background object data 304. Then, the processor 81 arranges these sea surface objects 102 within the virtual game space such that a multi-layer structure is formed as described above. In addition, the processor 81 generates the player object 101 on the basis of the player object data 303 and disposes the player object 101 at a predetermined position on the circumferential curved surface of the sea surface object 102A. Furthermore, the processor 81 disposes the virtual camera 104 at a predetermined position within the virtual game space on the basis of the virtual camera parameter 306, and sets the angle of view, the direction, etc., of the virtual camera 104 as appropriate. Moreover, the processor 81 also arranges other objects, the background image 103, etc., within the virtual game space as appropriate. Then, the processor 81 takes an image of the virtual game space, in which various objects, etc., are arranged, with the virtual camera 104 to generate a game image, and outputs the game image to the display 12.

Next, in step S2, the processor 81 acquires the operation data 302. Subsequently, in step S3, the processor 81 determines whether a player's operation content indicated by the operation data 302 is a movement instruction for the player object 101.

As a result of the determination, if the player's operation content is a movement instruction for the player object 101 (YES in step S3), the processor 81 subsequently performs, in step S4, a process of rotating the sea surface objects 102 about the cylinder axes thereof on the basis of the content of the movement instruction. A rotation direction is determined on the basis of the movement direction of the player object 101 indicated by the operation data 302. For example, if the instruction is an instruction for a movement direction in which the player object 101 moves forward, the rotation direction is determined as a direction of rotation that is the counterclockwise direction in FIG. 6 described above. If the instruction is an instruction for a movement direction in which the player object 101 moves backward, the rotation direction is determined as a direction of rotation that is the clockwise direction in FIG. 6 described above. Moreover, the rotation speed of each sea surface object 102 is determined on the basis of the information regarding rotation speed included in the terrain/background object data 304. As described above, the rotation speed is determined such that the rotation speed of the sea surface object 102 closer to the player object 101 is faster than the rotation speeds of the other sea surface objects.

As described above, in the exemplary embodiment, the coordinate position of the player object 101 itself in the game space coordinate system is not changed, and each sea surface object 102 is rotated, thereby changing the relative position of the player object 101 on the cylindrical curved surface of the sea surface object 102. Meanwhile, the other objects arranged on the circumferential curved surface of each sea surface object 102 are each moved with rotation of the sea surface object 102 such that the relative positional relationship of the other objects on the circumferential curved surface is not changed. That is, the relative positional relationship of each of the other objects is not changed, and the coordinate position of each of the other objects in the game space coordinate system is changed. For example, in the case where objects having a property of being fixed in position such as island objects have been arranged, these other objects may be each moved with rotation of the sea surface object 102 such that the relative positional relationship of the other objects on the circumferential curved surface is not changed. As a result, a state where the player object 101 is approaching the island objects is represented.

On the other hand, as a result of the determination in step S3, described above, if the player's operation content is not a movement instruction for the player object 101 (NO in step S3), the process in step S4 described above is skipped, and the processor 81 proceeds to a process in the next step 5.

Next, in step S5, the processor 81 performs various types of game processing other than the above control of rotation of the sea surface objects 102. For example, determination as to collision of the player object 101 with another predetermined object and processing corresponding to the result of the determination are performed. In addition, if the content indicated by the operation data 302 is not a movement instruction for the player object 101, other game processing based on the operation content is performed as appropriate. For example, if an attack operation or the like has been performed, processing regarding an attack is performed as appropriate. Then, processing of reflecting the result of the game processing in the virtual game space is also performed.

Next, in step S6, the processor 81 takes an image of the virtual game space in which the rotation of each sea surface object 102 and the game processing have been reflected, with the virtual camera 104 to generate a game image. Subsequently, in step S7, the processor 81 outputs the generated game image to the display 12.

Next, in step S8, the processor 81 determines whether a game end condition has been satisfied. For example, the processor 81 determines whether an explicit game end instruction has been made by the player. As a result of the determination, if the game end condition has not been satisfied (NO in step S8), the processor 81 returns to step S2 described above, and the processing is repeated. If the game end condition has been satisfied (YES in step S8), the game processing is ended.

As described above, in the exemplary embodiment, in the case of representing a state where a player object is moving on sea, a plurality of sea surface objects having a cylindrical shape are arranged so as to form a multi-layer structure, and are rotated at rotation speeds different from each other. In addition, each sea surface object has a transmissive portion and non-transmissive portions. Therefore, the sea surface objects 102 in lower layers are seen through the transmissive portion. Accordingly, representation of sea with a sense of depth in the direction toward the cylinder axis can be achieved through simple processing.

Second Exemplary Embodiment

Hereinafter, a second exemplary embodiment will be described. In the above first exemplary embodiment, the example in which a plurality of terrain/background objects having a cylindrical shape are arranged within a virtual game space so as to form a multi-layer structure has been described. In the second exemplary embodiment, the example of not arranging a plurality of terrain/background objects such that a concentric multi-layer structure is formed but arranging these terrain/background objects such that the cylinder axes thereof are located at different positions, will be described.

Figure 14:
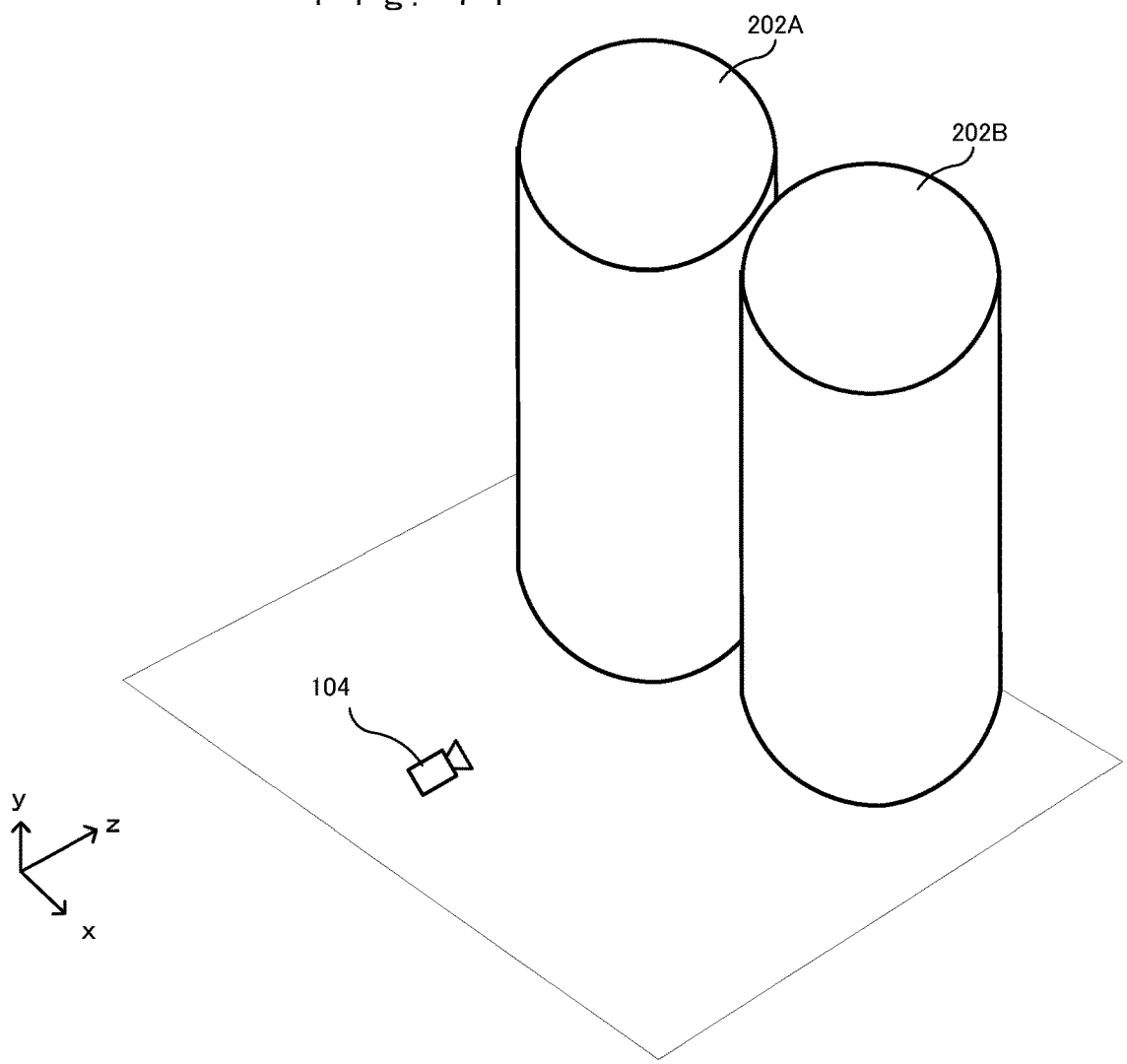
FIG. 14 is a diagram showing an arrangement relationship between a virtual camera and terrain/background objects in a second exemplary embodiment.
Figure 15:
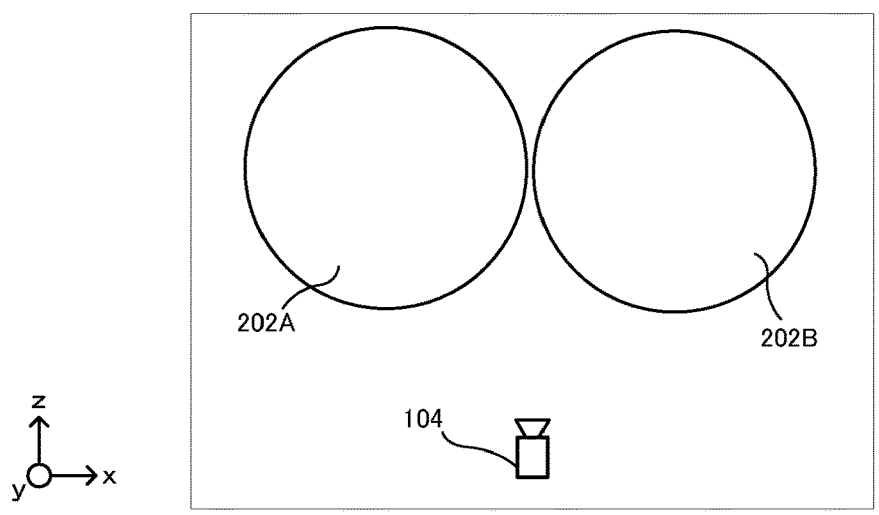
FIG. 15 is a diagram showing the arrangement relationship between the virtual camera and the terrain/background objects in the second exemplary embodiment.
Figure 16:
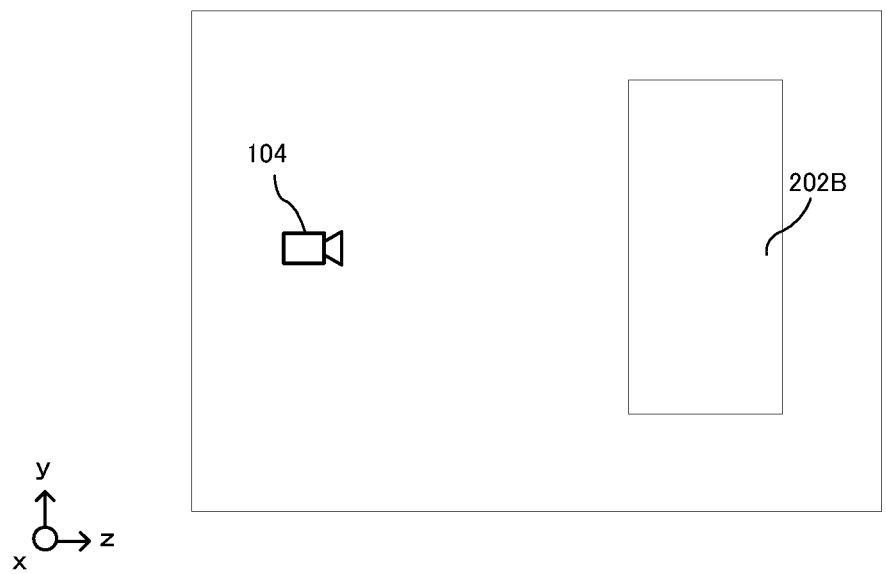
FIG. 16 is a diagram showing the arrangement relationship between the virtual camera and the terrain/background objects in the second exemplary embodiment.
Figure 17:
FIG. 17 shows a non-limiting example of a game screen in the second exemplary embodiment.

In the second exemplary embodiment, processing of representing a state where the player object 101 is moving (flying) in the air is taken as an example. FIGS. 14 to 16 show a concept of arrangement of a plurality of terrain/background objects in the second exemplary embodiment. In addition, FIG. 17 shows an example of a game image in the second exemplary embodiment. The game image shown in FIG. 17 is an example of a game image that is displayed on a subjective screen and on which the player object 101 itself is not displayed. Therefore, in the second exemplary embodiment, the position of the virtual camera 104 in the game space coordinate system is the position of the player object 101. In another embodiment, for example, the virtual camera 104 may be disposed behind the player object 101, and a game image may be displayed on an objective screen. That is, the player object 101 may be included in the field of view of the virtual camera 104.

As shown in FIGS. 14 to 16, in the second exemplary embodiment, two terrain/background objects that are terrain/background objects 202A and 202B having a (single-layer) cylindrical shape are used. In this example, a state where the player object 101 is moving in the air is represented, and thus an image of sky with clouds is rendered on each of the cylindrical curved surfaces of the terrain/background objects 202A and 202B (hereinafter, sometimes collectively referred to as terrain/background objects 202). That is, in the second exemplary embodiment, the terrain/background objects 202 are mainly used as a background. In addition, in this example, each cylindrical curved surface does not have a transmissive portion as in the first exemplary embodiment, and an image of sky is rendered as a background on the entirety of the cylindrical curved surface. Hereinafter, the terrain/background objects in the second exemplary embodiment are referred to as sky background objects.

As shown in FIGS. 14 to 16, the sky background objects 202A and 202B are arranged adjacent to each other at positions at which the sky background objects 202A and 202B do not overlap each other. In addition, the sky background objects 202A and 202B are arranged within a game space such that each of the sky background objects 202A and 202B is displayed in an orientation in which the cylinder axis thereof extends substantially along the vertical direction in a game image. In other words, the sky background objects 202A and 202B are arranged so as to have a parallel positional relationship in which the cylinder axes thereof are parallel to each other. In addition, as for the position of the virtual camera 104, the virtual camera 104 is disposed on an x-axis in FIG. 14 at a position on the boundary between the adjacent sky background objects 202A and 202B (or, between the sky background objects 202A and 202B). That is, the virtual camera 104 is disposed such that the position at the boundary is in front of the imaging direction of the virtual camera 104. Moreover, when seen as a position on a y-axis, the virtual camera 104 is disposed at a position, on the y-axis, which substantially corresponds to the center of the length of the sky background objects 202A and 202B. When seen as a position on a z-axis, the virtual camera 104 is disposed at a position away from the sky background objects 202A and 202B to some extent such that both of the sky background objects 202A and 202B are displayed on a game image.

In this example, the sky background objects 202A and 202B are arranged adjacent to each other, and, as for the arrangement interval therebetween, the example in which the sky background objects 202A and 202B are arranged with substantially no interval therebetween is shown. In another embodiment, the sky background objects 202A and 202B may be arranged such that the arrangement interval therebetween is increased.

Figure 18:
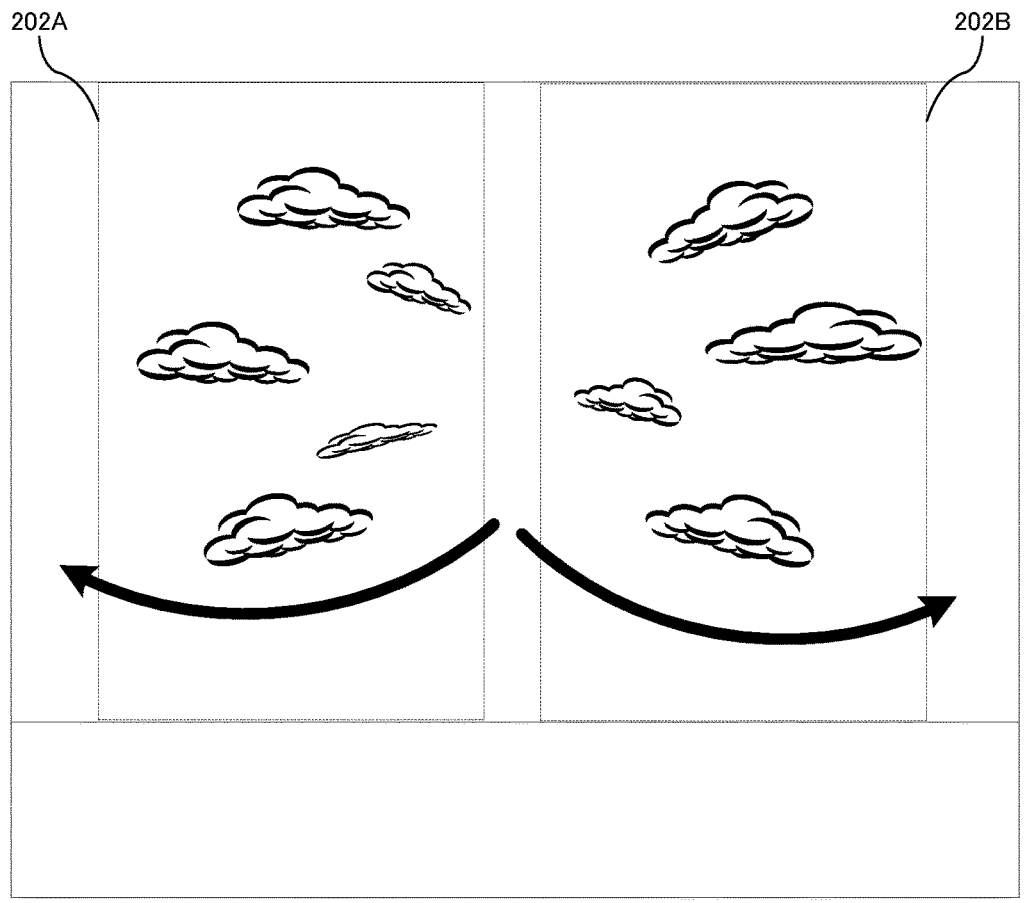
FIG. 18 is a diagram for explaining rotation directions of the terrain/background objects in the second exemplary embodiment.
Figure 19:
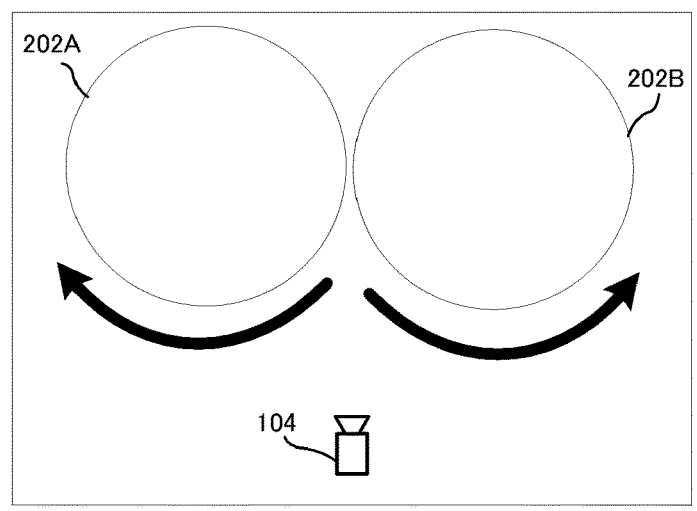
FIG. 19 is a diagram for explaining the rotation directions of the terrain/background objects in the second exemplary embodiment.

The sky background objects 202A and 202B in the second exemplary embodiment are also rotated about the cylinder axes thereof in accordance with a movement instruction input for the player object 101. In the second exemplary embodiment, the sky background objects 202A and 202B are rotated such that the rotation directions thereof are opposite to each other. In addition, as for rotation speed, the sky background objects 202A and 202B are rotated at the same rotation speed. FIGS. 18 and 19 are diagrams for explaining the rotation directions. In this example, the sky background object 202A is rotated from right toward left, and the sky background object 202B is rotated from left toward right. In the example in FIGS. 18 and 19, the sky background object 202A is rotated about the cylinder axis thereof clockwise, and the sky background object 202B is rotated about the cylinder axis thereof counterclockwise. In addition, as for the position of the player object 101, similar to the first exemplary embodiment, the position thereof in the game space coordinate system is not changed. Therefore, as a result of such rotation, the relative positional relationships between the player object (virtual camera) and the cylindrical curved surfaces of the sky background objects 202A and 202B are also changed. By rotating the sky background objects 202A and 202B in the directions opposite to each other as described above, a state where the player object is moving forward in the depth direction can be represented. For example, as shown in FIG. 18, an image (for example, images of clouds) on the circumferential curved surface of the sky background object 202A is displayed such that the image flows in the screen left direction from the back of the screen. Moreover, an image on the circumferential curved surface of the sky background object 202B is displayed such that the image flows in the screen right direction from the back of the screen. Accordingly, as for the screen example in FIG. 17, a state where the player object 101 is moving toward substantially the center of the screen in the depth direction can be represented.

Data used in the second exemplary embodiment is basically the same as in the first exemplary embodiment, except that the contents of the terrain/background object data 304 in the first exemplary embodiment are changed to contents indicating the sky background objects 202A and 202B used as a sky background as described above. In addition, specific processing is the same as the processing shown in flowchart in FIG. 13 described above. Therefore, the detailed description of the data used in the second exemplary embodiment and the processing is omitted.

As described above, in the second exemplary embodiment, the sky background objects 202A and 202B are arranged adjacent to each other. Furthermore, the virtual camera is disposed at such a position that the front of the virtual camera corresponds to the vicinity of the boundary between both objects. Then, the sky background objects 202A and 202B are rotated at the same speed in rotation directions opposite to each other in accordance with a movement instruction for the player object. Accordingly, a state where the player object 101 is moving in the depth direction can be represented through simple processing of merely rotating the sky background objects 202.

Third Exemplary Embodiment

Figure 20:
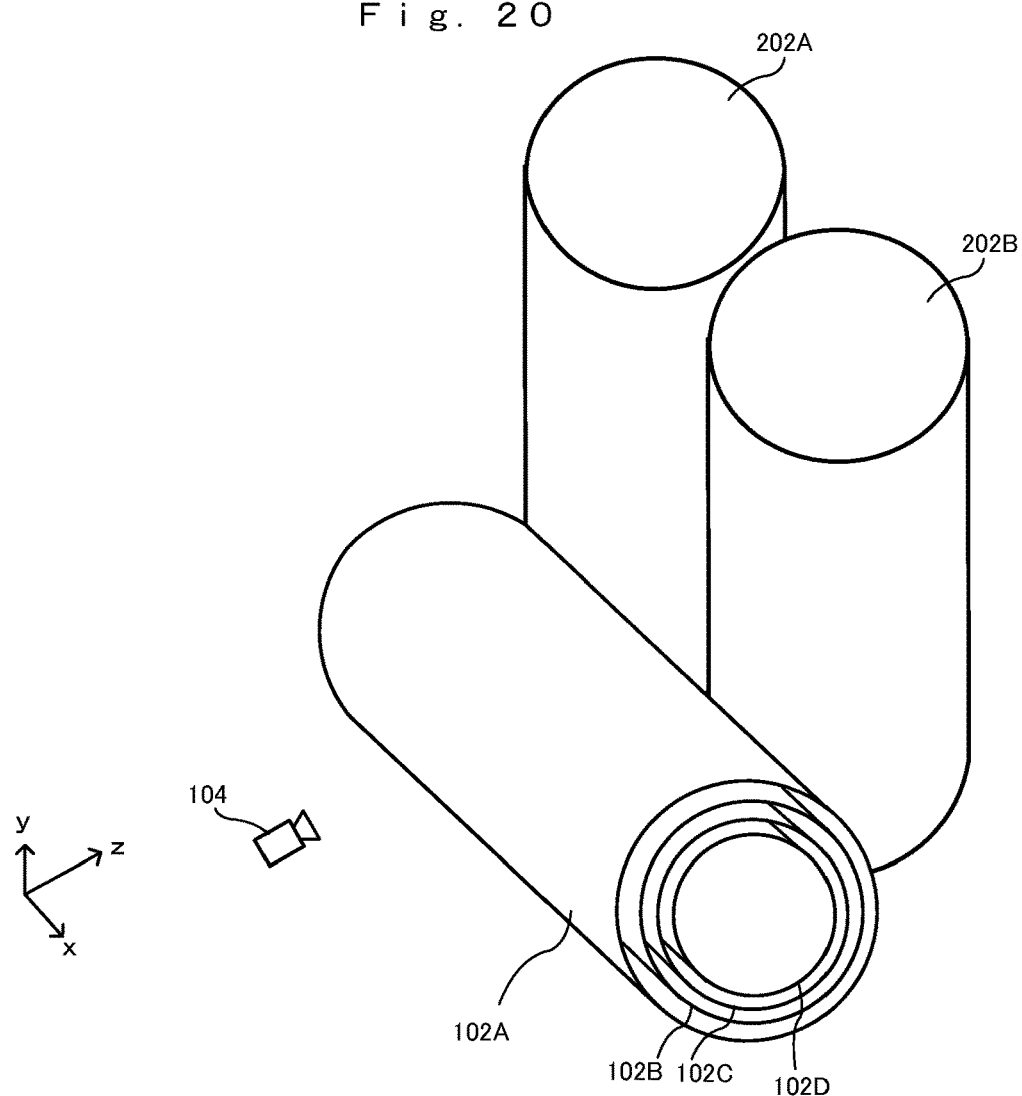
FIG. 20 is a diagram showing an arrangement relationship between a virtual camera and terrain/background objects in a third exemplary embodiment.
Figure 21:
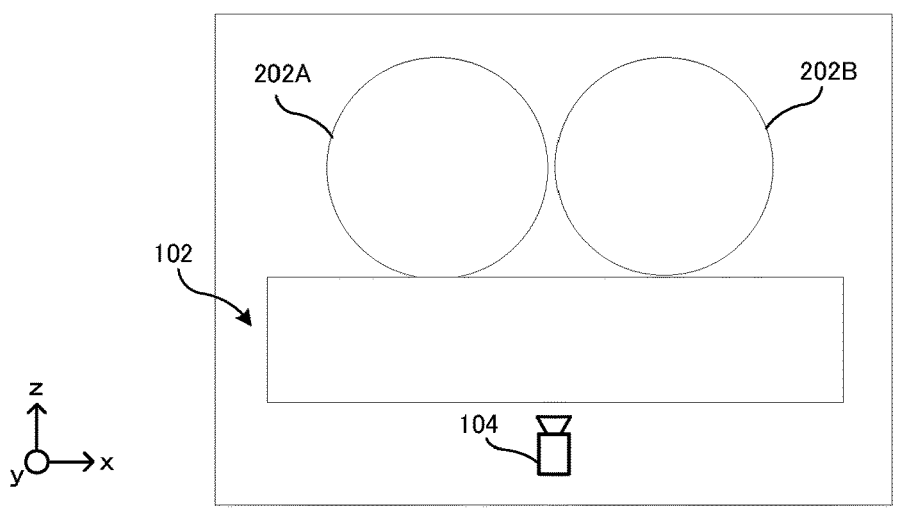
FIG. 21 is a diagram showing the arrangement relationship between the virtual camera and the terrain/background objects in the third exemplary embodiment.

Next, a third exemplary embodiment of the present invention will be described. In the third exemplary embodiment, arrangement of terrain/background objects is performed as a combination of the above first and second exemplary embodiments. FIGS. 20 to 22 show a concept of arrangement of terrain/background objects in the third exemplary embodiment. As shown in FIGS. 20 to 22, in the third exemplary embodiment, the sea surface objects 102A to 102D forming the concentric multi-layer structure shown in the first exemplary embodiment are arranged within a virtual game space. Furthermore, the sky background objects 202A and 202B shown in the second exemplary embodiment are arranged at the side, of the sea surface objects 102A to 102D, away from the virtual camera 104. With such an arrangement relationship, control of the rotation direction and the rotation speed of each terrain/background object is performed in the same manner as in the above first and second exemplary embodiments. Accordingly, through simple processing of merely rotating the terrain/background objects, it is possible to represent a more complicated terrain such that senses of depth in two different axes can be felt simultaneously. These senses of depth in the two different axes are a sense of depth in the z-axis direction in the game space coordinate system shown in FIG. 4 described above, etc., and a sense of depth in the direction from the circumferential curved surface of the sea surface objects 102A to D to the cylinder axis thereof.

[Modifications]

Figure 23:
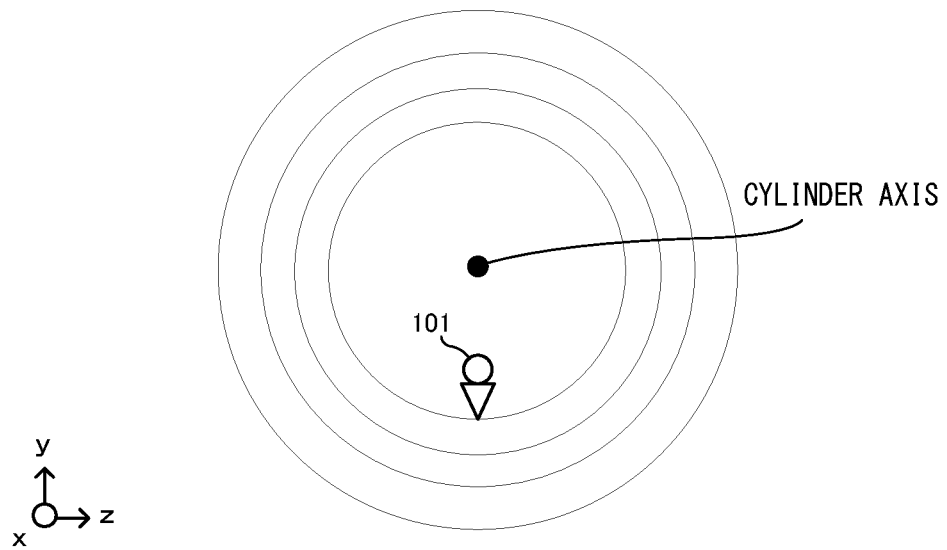
FIG. 23 is a diagram for explaining a modification.

In the above first exemplary embodiment, the example in which the player object 101 is disposed outside the sea surface object 102A disposed so as to form a part of a concentric multi-layer structure, has been shown. In another embodiment, the player object 101 may be disposed inside such a terrain/background object in a multi-layer structure. For example, as shown in FIG. 23, the player object 101 may be disposed inside the terrain/background object closest to the cylinder axis. Then, similar to the first exemplary embodiment, each cylindrical curved surface is provided with a transmissive portion and non-transmissive portions. In addition, rotation speeds may be set such that the rotation speed of the terrain/background object closest to the player object, that is, the rotation speed of the innermost terrain/background object in FIG. 23, is the fastest.

Figure 24:
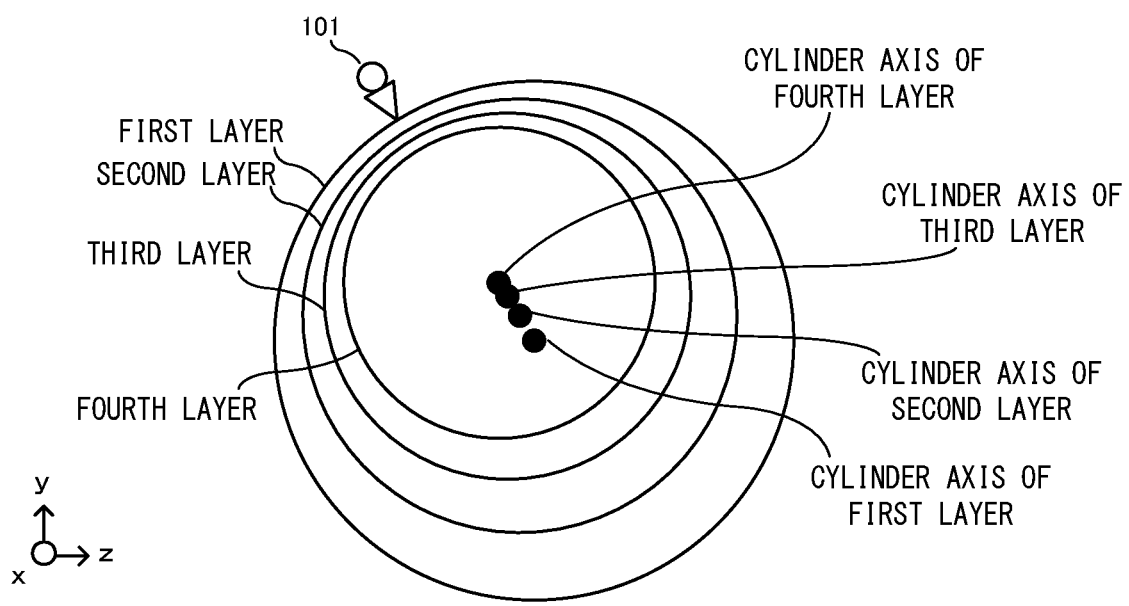
FIG. 24 is a diagram for explaining a modification.

Alternatively, in the case of arranging terrain/background objects such that a multi-layer structure is formed, the terrain/background objects may be arranged such that a non-concentric structure is formed as shown in FIG. 24, other than the concentric structure as in the first exemplary embodiment. In this case, the terrain/background objects may be arranged so as to form a non-concentric structure such that the position of the cylinder axis of the terrain/background object disposed farthest from the player object 101 is closer to the player object 101. In the example in FIG. 24, a positional relationship, in which the position of the cylinder axis of the terrain/background object in a "fourth layer" disposed farthest from the player object 101 is closer to the player object 101 than the positions of the other cylinder axes, is established. In this case as well, the same effects as in the above first exemplary embodiment are achieved by performing the same control as in the first exemplary embodiment. That is, the same effects as in the first exemplary embodiment are achieved by rotating a plurality of terrain/background objects on the basis of an input for instructing movement of the player object 101, taking an image of the state of the rotation of the terrain/background objects to generate a game image, and displaying the game image. The respective terrain/background objects may be rotated at rotation speeds different from each other. However, since the axes of the terrain/background objects are displaced relative to each other, even when the rotation speeds are equal to each other, movement of a terrain and a background seen from the virtual camera can be represented.

In the above second exemplary embodiment, the example in which two single-layer terrain/background objects are arranged in an orientation in which the directions of the cylinder axes thereof are along the vertical direction in a game image, has been shown. That is, the example in which two single-layer terrain/background objects are respectively arranged at the left and right sides in a game image, has been shown. Alternatively, for example, two single-layer terrain/background objects may be arranged in an orientation in which the cylinder axes thereof extend in the horizontal direction in a game image. That is, terrain/background objects may be respectively arranged at the upper and lower sides in a game image. Still alternatively, terrain/background objects may be arranged such that the cylinder axes thereof extend along a predetermined oblique direction in a game image.

In the first exemplary embodiment, the configuration in which the circumferential curved surface of the multi-layer structure has a transmissive portion and non-transmissive portions has been shown. In another embodiment, for example, a predetermined terrain image may be rendered on the entirety of the circumferential curved surface, and the entirety of the circumferential curved surface may be made translucent. In addition, a transmittance in such a translucent structure may be set such that at least the back of the structure can be seen through the structure.

In the above second exemplary embodiment, the example in which the single-layer terrain/background objects 202A and 202B are arranged side by side has been shown. In another embodiment, each of the terrain/background objects 202A and 202B may have a multi-layer structure with a transmissive portion and non-transmissive portions as in the first exemplary embodiment. Accordingly, it is possible to represent a more complicated background.

In the above embodiments, a cylindrical shape has been shown as an example of the shape of each terrain/background object. In another embodiment, terrain/background objects having a spherical shape may be used instead of terrain/background objects having a cylindrical shape. In this case, an axis passing through the center of the sphere may be used as an axis corresponding to the above cylinder axis. The same effects as in the first exemplary embodiment and the second exemplary embodiment can be achieved by rotating the terrain/background objects having a spherical shape about the axes thereof and performing the same arrangement and control as in the first exemplary embodiment and the second exemplary embodiment.

Figure 25:
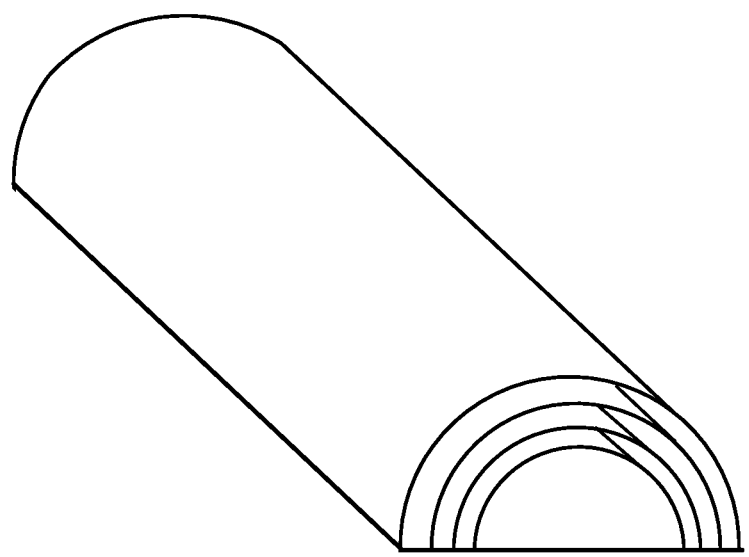
FIG. 25 is a diagram for explaining a modification.

As for the above terrain/background objects, the entirety of each terrain/background object does not have to have a cylindrical shape or a spherical shape, and a part of each terrain/background object may include a cylindrical curved surface or a spherical surface. For example, each terrain/background object may have a shape in which the top and bottom surfaces of a cylinder are not circular but semicircular (a semi-cylindrical shape) as shown in FIG. 25. Then, the above processing may be performed only for the portions that are cylindrical curved surfaces. In addition, as for movement control in this case, for example, movement control may be performed such that, when movement in the screen depth direction is continued, a location at which the cylindrical curved surfaces end becomes a "dead end".

In each of the above embodiments, the case where the series of processes according to the game processing are performed in a single apparatus has been described. However, in another embodiment, the above series of processes may be performed in an information processing system that includes a plurality of information processing apparatuses. For example, in an information processing system that includes a terminal side apparatus and a server side apparatus capable of communicating with the terminal side apparatus via a network, a part of the series of processes may be performed by the server side apparatus. Alternatively, in an information processing system that includes a terminal side apparatus and a server side apparatus capable of communicating with the terminal side apparatus via a network, a main process of the series of the processes may be performed by the server side apparatus, and a part of the series of the processes may be performed by the terminal side apparatus. Still alternatively, in the information processing system, a server side system may include a plurality of information processing apparatuses, and a process to be performed in the server side system may be divided and performed by the plurality of information processing apparatuses.

While the exemplary embodiments have been described in detail, the foregoing description is in all aspects illustrative and not restrictive. It is to be understood that numerous other modifications and variations can be devised without departing from the scope of the exemplary embodiments.

What is claimed is:

1. A computer-readable non-transitory storage medium having an image processing program stored therein, the image processing program, when executed, causing a computer of an information processing apparatus to perform operations comprising:
arranging a plurality of terrain/background objects each including at least a part of a cylindrical curved surface or a spherical surface, within a virtual space;
controlling an operation object to be operated on the basis of an operation input on an operation device, within the virtual space;
rotating the plurality of terrain/background objects about rotation center axes, which are axes passing through centers of the cylinders or the spheres, on the basis of a movement instruction input to the operation device such that a relative positional relationship between each of the plurality of terrain/background objects and the operation object is changed; and
generating an image of the virtual space to be displayed on a display device, using a virtual camera,
wherein the plurality of terrain/background objects are each at least a part of a cylindrical curved surface or a spherical surface of a multi-layer structure, at least a part of the surface allows a back side thereof to be seen therethrough, and the cylinders or the spheres have radii different from each other.

2. The storage medium according to claim 1, wherein the image processing program, when executed, causes the computer to perform further operations comprising rotating the plurality of terrain/background objects about the common rotation center axis at rotation speeds different from each other, on the basis of the movement instruction input.

3. The storage medium according to claim 1, wherein the image processing program, when executed, causes the computer to perform further operations comprising rotating the plurality of terrain/background objects about the rotation center axes different from each other at rotation speeds different from each other, on the basis of the movement instruction input.

4. The storage medium according to claim 3, wherein the rotation center axes different from each other are set such that the rotation center axis of the terrain/background object having the cylindrical curved surface or the spherical surface more distant from a position of the operation object is located closer to the operation object.

5. The storage medium according to claim 1, wherein the image processing program, when executed, causes the computer to perform further operations comprising:
disposing the operation object on the cylindrical curved surface or the spherical surface; and
controlling the virtual camera within the virtual space such that the operation object is included in a field of view of the virtual camera.

6. The storage medium according to claim 1, wherein:
the plurality of terrain/background objects are arranged in an orientation in which the rotation center axes thereof are parallel to each other, and in a positional relationship in which the terrain/background objects are adjacent to each other without overlapping each other within the virtual space, and
the image processing program, when executed, causes the computer to perform further operations comprising rotating the terrain/background objects on the basis of the movement instruction input such that rotation directions of the terrain/background objects adjacent to each other are opposite to each other.

7. The storage medium according to claim 6, wherein the image processing program, when executed, causes the computer to perform further operations comprising:
disposing a first terrain/background object at a position included at one side of a boundary and disposing a second terrain/background object at a position included at another side of the boundary, when a predetermined straight line passing through substantially a center of the image of the virtual space to be displayed on the display device is defined as the boundary; and
rotating the first terrain/background object and the second terrain/background object such that rotation directions thereof are opposite to each other.

8. An image processing system comprising at least one processor and an operation device, the processor being configured to perform operations comprising:
arranging a plurality of terrain/background objects each including at least a part of a cylindrical curved surface or a spherical surface, within a virtual space;
controlling an operation object to be operated on the basis of an operation input on the operation device, within the virtual space;
rotating the plurality of terrain/background objects about rotation center axes, which are axes passing through centers of the cylinders or the spheres, on the basis of a movement instruction input to the operation device such that a relative positional relationship between each of the plurality of terrain/background objects and the operation object is changed; and
generating an image of the virtual space to be displayed on a display device, using a virtual camera,
wherein the plurality of terrain/background objects are each at least a part of a cylindrical curved surface or a spherical surface of a multi-layer structure, at least a part of the surface allows a back side thereof to be seen therethrough, and the cylinders or the spheres have radii different from each other.

9. The image processing system according to claim 8, wherein the processor is configured to perform further operations comprising rotating the plurality of terrain/background objects about the common rotation center axis at rotation speeds different from each other, on the basis of the movement instruction input.

10. The image processing system according to claim 8, wherein the processor is configured to perform further operations comprising rotating the plurality of terrain/background objects about the rotation center axes different from each other at rotation speeds different from each other, on the basis of the movement instruction input.

11. The image processing system according to claim 10, wherein the rotation center axes different from each other are set such that the rotation center axis of the terrain/background object having the cylindrical curved surface or the spherical surface more distant from a position of the operation object is located closer to the operation object.

12. The image processing system according to claim 8, wherein the processor is configured to perform further operations comprising disposing the operation object on the cylindrical curved surface or the spherical surface, and controlling the virtual camera within the virtual space such that the operation object is included in a field of view of the virtual camera.

13. The image processing system according to claim 8, wherein:

the plurality of terrain/background objects are arranged in an orientation in which the rotation center axes thereof are parallel to each other, and in a positional relationship in which the terrain/background objects are adjacent to each other without overlapping each other within the virtual space, and the processor is configured to perform further operations comprising rotating the terrain/background objects on the basis of the movement instruction input such that rotation directions of the terrain/background objects adjacent to each other are opposite to each other.

14. The image processing system according to claim 13, wherein the processor is configured to perform further operations comprising disposing a first terrain/background object at a position included at one side of a boundary and disposing a second terrain/background object at a position included at another side of the boundary, when a predetermined straight line passing through substantially a center of the image of the virtual space to be displayed on the display device is defined as the boundary, and rotating the first terrain/background object and the second terrain/background object such that rotation directions thereof are opposite to each other.

15. An image processing apparatus comprising at least one processor and an operation section, the processor being configured to perform operations comprising:
   arranging a plurality of terrain/background objects each including at least a part of a cylindrical curved surface or a spherical surface, within a virtual space;
   controlling an operation object to be operated on the basis of an operation input on the operation section, within the virtual space;
   rotating the plurality of terrain/background objects about rotation center axes, which are axes passing through centers of the cylinders or the spheres, on the basis of a movement instruction input to the operation section such that a relative positional relationship between each of the plurality of terrain/background objects and the operation object is changed; and
   generating an image of the virtual space to be displayed on a display device, using a virtual camera,
   wherein the plurality of terrain/background objects are each at least a part of a cylindrical curved surface or a spherical surface of a multi-layer structure, at least a part of the surface allows a back side thereof to be seen therethrough, and the cylinders or the spheres have radii different from each other.

16. An image processing method executed by a computer configured to control an information processing apparatus, the image processing method comprising:
   arranging a plurality of terrain/background objects each including at least a part of a cylindrical curved surface or a spherical surface, within a virtual space;
   controlling an operation object to be operated on the basis of an operation input on an operation device, within the virtual space;
   rotating the plurality of terrain/background objects about rotation center axes, which are axes passing through centers of the cylinders or the spheres, on the basis of a movement instruction input to the operation device such that a relative positional relationship between each of the plurality of terrain/background objects and the operation object is changed; and
   generating an image of the virtual space to be displayed on a display device, using a virtual camera,
   wherein the plurality of terrain/background objects are each at least a part of a cylindrical curved surface or a spherical surface of a multi-layer structure, at least a part of the surface allows a back side thereof to be seen therethrough, and the cylinders or the spheres have radii different from each other.

17. The image processing method according to claim 16, further comprising rotating the plurality of terrain/background objects about the common rotation center axis at rotation speeds different from each other, on the basis of the movement instruction input.

18. The image processing method according to claim 16, further comprising rotating the plurality of terrain/background objects about the rotation center axes different from each other at rotation speeds different from each other, on the basis of the movement instruction input.

19. The image processing method according to claim 18, wherein the rotation center axes different from each other are set such that the rotation center axis of the terrain/background object having the cylindrical curved surface or the spherical surface more distant from a position of the operation object is located closer to the operation object.

20. The image processing method according to claim 16, further comprising:
   disposing the operation object on the cylindrical curved surface or the spherical surface; and
   controlling the virtual camera within the virtual space such that the operation object is included in a field of view of the virtual camera.

* * * * *